United States Patent
Braun

(10) Patent No.: US 7,476,190 B2
(45) Date of Patent: Jan. 13, 2009

(54) TOOL MAGAZINE FOR A MACHINE TOOL

(75) Inventor: Hans-Dieter Braun, Frittlingen (DE)

(73) Assignee: Haas Schleifmaschinen GmbH, Trossingen (DE)

( * ) Notice: Subject to any disclaimer, the term of this patent is extended or adjusted under 35 U.S.C. 154(b) by 0 days.

(21) Appl. No.: 11/890,492

(22) Filed: Aug. 7, 2007

(65) Prior Publication Data
US 2008/0207417 A1 Aug. 28, 2008

(30) Foreign Application Priority Data
Aug. 9, 2006 (DE) ................. 10 2006 037 435

(51) Int. Cl.
*B23Q 3/157* (2006.01)
(52) U.S. Cl. .................. 483/67; 483/65; 483/56; 211/1.55; 211/1.53; 211/70.6
(58) Field of Classification Search ............... 483/65, 483/66, 67, 68, 58, 59, 60–62, 63–64, 5; 211/1.55, 1.53, 1.52, 1.51, 70.6, 69
See application file for complete search history.

(56) References Cited

U.S. PATENT DOCUMENTS

| | | | | | |
|---|---|---|---|---|---|
| 2,318,081 A | * | 5/1943 | Kerry | .......................... | 211/70.6 |
| 2,371,433 A | * | 3/1945 | Davis | .......................... | 211/70.6 |
| 3,688,362 A | * | 9/1972 | Durr et al. | ..................... | 483/67 |
| 3,817,391 A | * | 6/1974 | Lohneis et al. | ............. | 211/1.56 |
| 4,053,968 A | * | 10/1977 | Johnson et al. | ................ | 483/56 |
| 4,117,586 A | * | 10/1978 | Uchida et al. | .................. | 483/68 |
| 4,117,937 A | * | 10/1978 | Ratti | .......................... | 211/70.6 |
| 4,155,460 A | * | 5/1979 | Ratti | .......................... | 211/70.6 |
| 4,359,163 A | * | 11/1982 | Ratti | .......................... | 211/70.6 |
| 4,509,649 A | * | 4/1985 | Evans | .......................... | 211/70.6 |
| 4,535,897 A | * | 8/1985 | Remington et al. | ......... | 211/70.6 |
| 5,820,538 A | * | 10/1998 | Watkinson | .................... | 483/59 |
| 6,126,526 A | * | 10/2000 | Herrscher et al. | ............. | 483/58 |
| 6,228,006 B1 | * | 5/2001 | Horn et al. | ..................... | 483/55 |
| 2008/0039305 A1 | * | 2/2008 | Bader et al. | .................... | 483/23 |
| 2008/0039307 A1 | * | 2/2008 | Braun | .......................... | 483/55 |

FOREIGN PATENT DOCUMENTS

| | | | |
|---|---|---|---|
| DE | 3731280 A1 | * | 3/1989 |
| DE | 41 22 821 | | 1/1993 |
| DE | 198 44 242 | | 4/2000 |
| EP | 1260306 A1 | * | 11/2002 |
| JP | 53-080083 A | * | 7/1978 |
| JP | 54-064780 A | * | 5/1979 |
| JP | 2005-103687 A | * | 4/2005 |
| RU | 1787739 A1 | * | 1/1993 |

* cited by examiner

*Primary Examiner*—Erica E Cadugan
(74) *Attorney, Agent, or Firm*—The Nath Law Group; Jerald L. Meyer; Derek Richmond

(57) ABSTRACT

A tool magazine for a machine tool has a magazine wheel (34) on whose periphery a tool holder (50) for mounting tools (56) is located. The positions and spacings between the tool holders (50) in a T-groove (48) on the periphery of the magazine wheel (34) are adjustable and fixable in their respective positions.

14 Claims, 24 Drawing Sheets

TOOL MAGAZINE FOR A MACHINE TOOL

Figure 1:
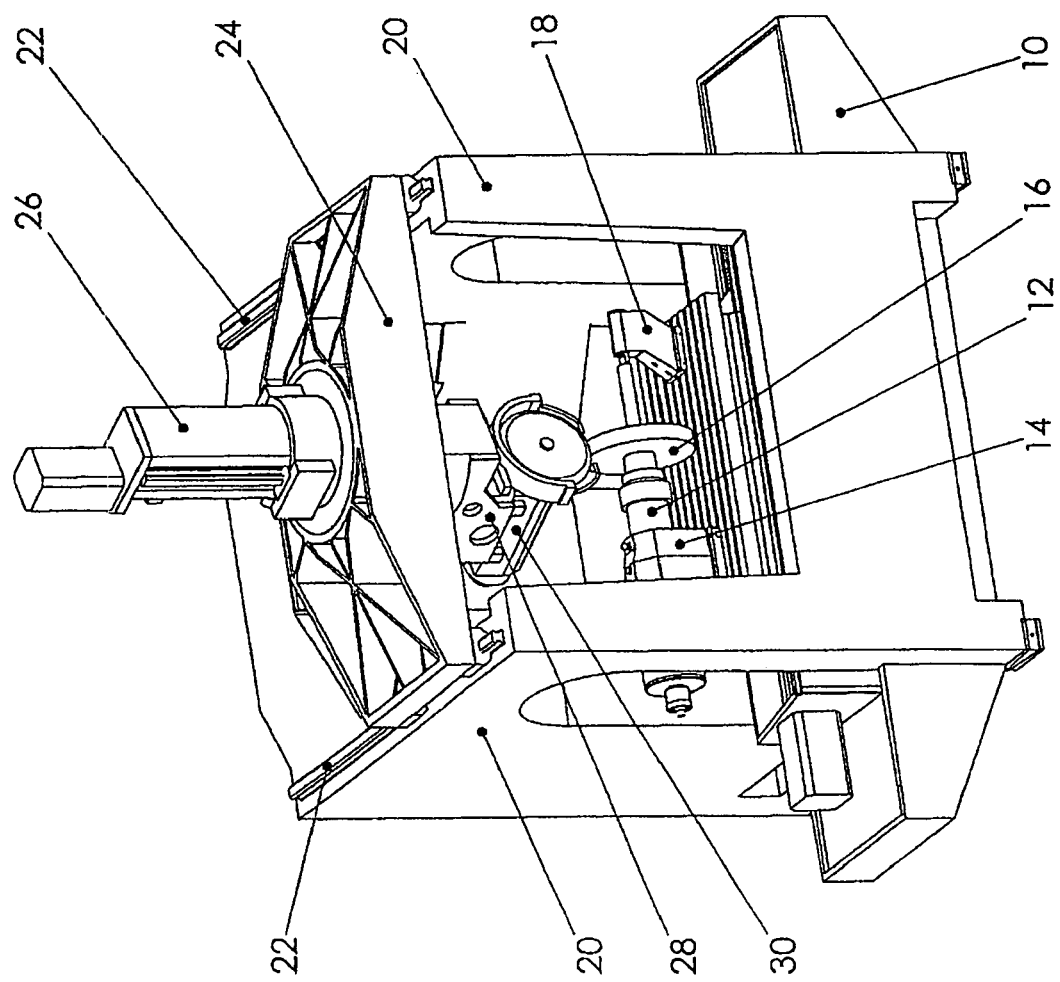

This invention concerns a tool magazine for a machine tool, the tool magazine having tool holders, which are successively arranged in a row in the tool magazine and which accept tools that are interchangeable with their tool central longitudinal axes essentially perpendicular to the row, characterized in that the positions of the tool holders in the tool magazine are adjustable in the direction of the row and fixable in their respective positions.

Tool magazines which can accept several tools are frequently used in machine tools for machine processing of work pieces, e.g. for grinding, milling, drilling, reaming, turning, polishing and thread cutting. In particular, if a work piece is machined in successive steps with different tools, it is important for the tools held in the magazine to be exchanged rapidly into the tool spindle. Different kinds of systems for exchanging tools between the tool magazine and the tool spindle are known. In the so-called pick-up system, the tool spindle and the tool storage device are displaced relative to one another and are positioned opposite each other so that the tool spindle can take the respective tool directly from the magazine or respectively can deposit a previously used tool in the tool magazine. Such a system is for example disclosed in DE 198 44 242 C2. In another system, an exchange device, usually a gripping arm, is interposed between the tool magazine and the tool spindle in order to transfer the tools. Such a system is for example described in DE 37 31 280 C2.

The known tool magazines have tool holders in which the tools are held. The tool holders are successively arranged in the tool magazine in a linear or circular succession, so that, through a suitable controlled movement of the tool magazine, a selected tool holder can be brought into the change position, in order to deposit a previously used tool into the tool holder or to remove a tool held at the ready in the tool holder. In this connection, the tool holders are arranged in the tool magazine in series, in fixed positions and at a fixed distance from each other. This reciprocal distance is predetermined by the condition that the tools with the largest diameter must be accepted in the successive neighboring tool holders without obstructing each other. Thus, an increasing number of storage locations in the tool magazine results in an ever growing space requirement.

It is the object of this invention to design a tool magazine in which the mounting capacity for tools can be increased, without the space requirement for the tool magazine increasing accordingly.

This objective is achieved according to this invention by a tool magazine having tool holders, which are successively arranged in a row in the tool magazine and which accept tools that are interchangeable with their tool central longitudinal axes essentially perpendicular to the row, characterized in that the positions of the tool holders in the tool magazine are adjustable in the direction of the row and fixable in their respective positions.

Advantageous embodiments of the invention are disclosed in the dependent claims.

According to this invention, the tool holders are not held in the tool magazine in fixed positions. Their positions in the sequence in the tool magazine can rather be adjusted, whereby the distance of the tool holders following each other in the sequence can be varied. The distance between the tool holders can thus be adjusted depending on the respective application, so that they are at the minimum distance, which corresponds to the diameters of the tools actually deposited in the successive tool holders. The tool holders in their respective adjusted positions are then secured for the operation of the machine tool.

In a constructionally simple embodiment, a T-groove in which the tool holders fit, extending in the direction of the series of tool holders, is positioned in the rigid body of the tool magazine, so that the tool holders are adjustable in the T-groove and can be clamped in the T-groove to fix their positions.

In a preferred embodiment, the tool magazine is configured as a circular magazine wheel, which is rotationally driven about its central shaft. The tool holders are located on the periphery of the magazine wheel. The tool holders are preferably arranged so that they accept the tools with the tool axes extending radially with respect to the magazine wheel. In many cases, the diameter of the actual tool is greater than the diameter of its clamping shaft. Therefore the tools are preferably held in the tool holders in such a way that their shafts are directed radially inward into the magazine wheel.

With such a design of the tool magazine with a circular magazine wheel and inward oriented tool shafts, a pick-up system can be achieved in that the tool spindle reaches into the inside of the magazine wheel and is moved radially against the tool holders with the stored tools. If the magazine wheel is placed in the machine tool with a vertical axis, a particularly favorable design is obtained if the tool holders on the periphery of the magazine wheel are positioned so that they have a mounting which opens upward, into which the respective tools are placed. The tool can be placed with its clamping groove into the mounting of the tool holder from above, or respectively, it can be lifted out of the mounting in the upward direction. Without additional clamping and retaining measures, the tool is thereby held in the mounting by its own weight and is secured against axial displacement and tilting by being held in the clamping groove.

If the machine tool is, for example, designed as a universal grinding machine, then grinding wheels and possibly drills or milling cutters are held at the ready as tools. The grinding wheels usually have a large diameter, while drills have a minimal diameter. In conventional magazines, the distance between the tool holders must therefore depend on the maximum diameter of the stored grinding wheels. On the other hand, according to this invention, the tool holders can carry the drills, milling cutters or other tools having a small diameter in a tighter arrangement. The number of tools stored in the tool magazine of this invention can thus be increased by double or more compared with a magazine of the same size.

After adjusting and fixing the positions of the tool holders, the respective fixed position of the tool holders with the associated tools is entered in the controller of the machine tool, so that the individual magazine positions of the tool magazine corresponding to these stored tool positions can be achieved in a controlled manner.

Figure 3:
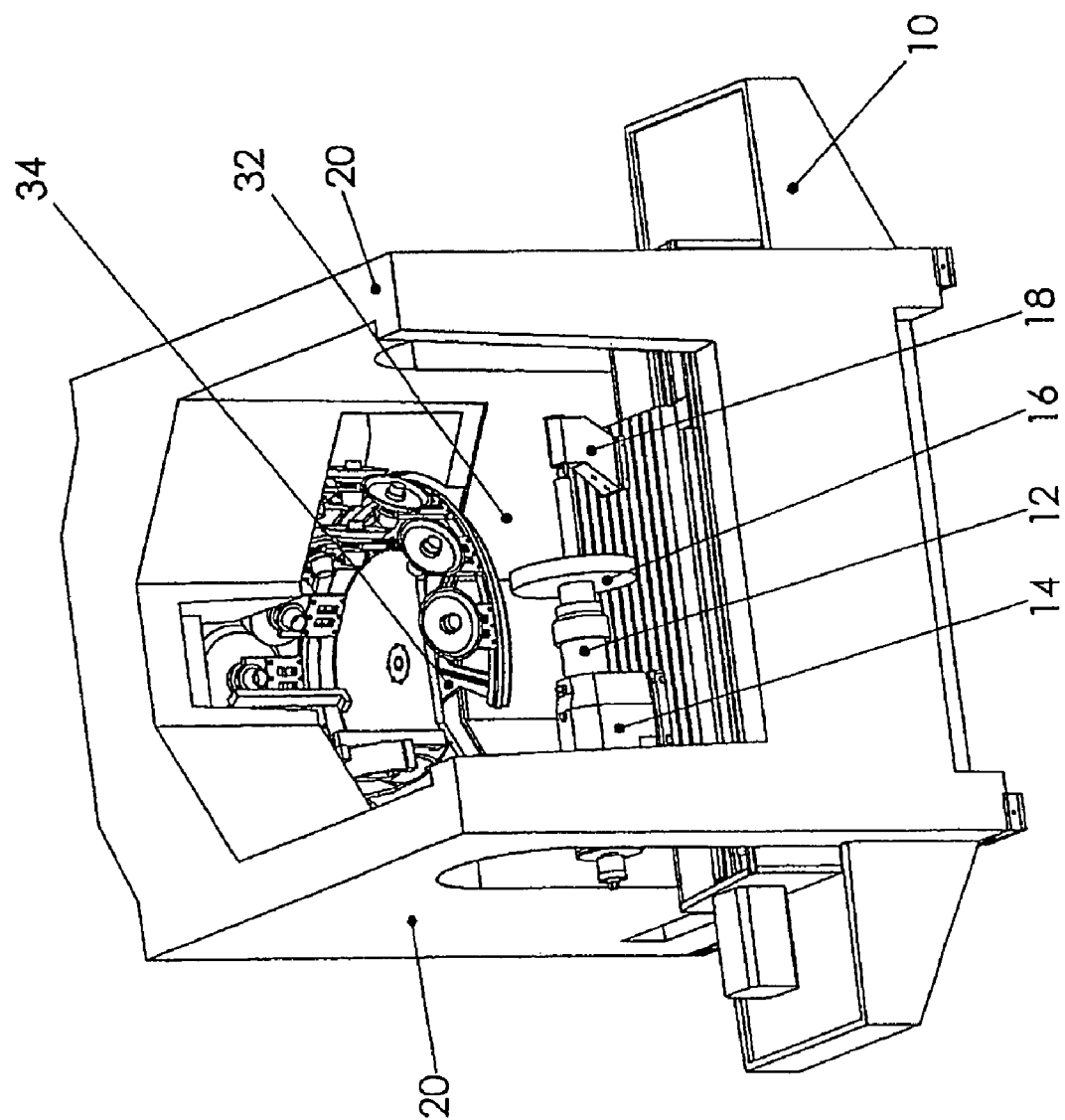
Figure 4:
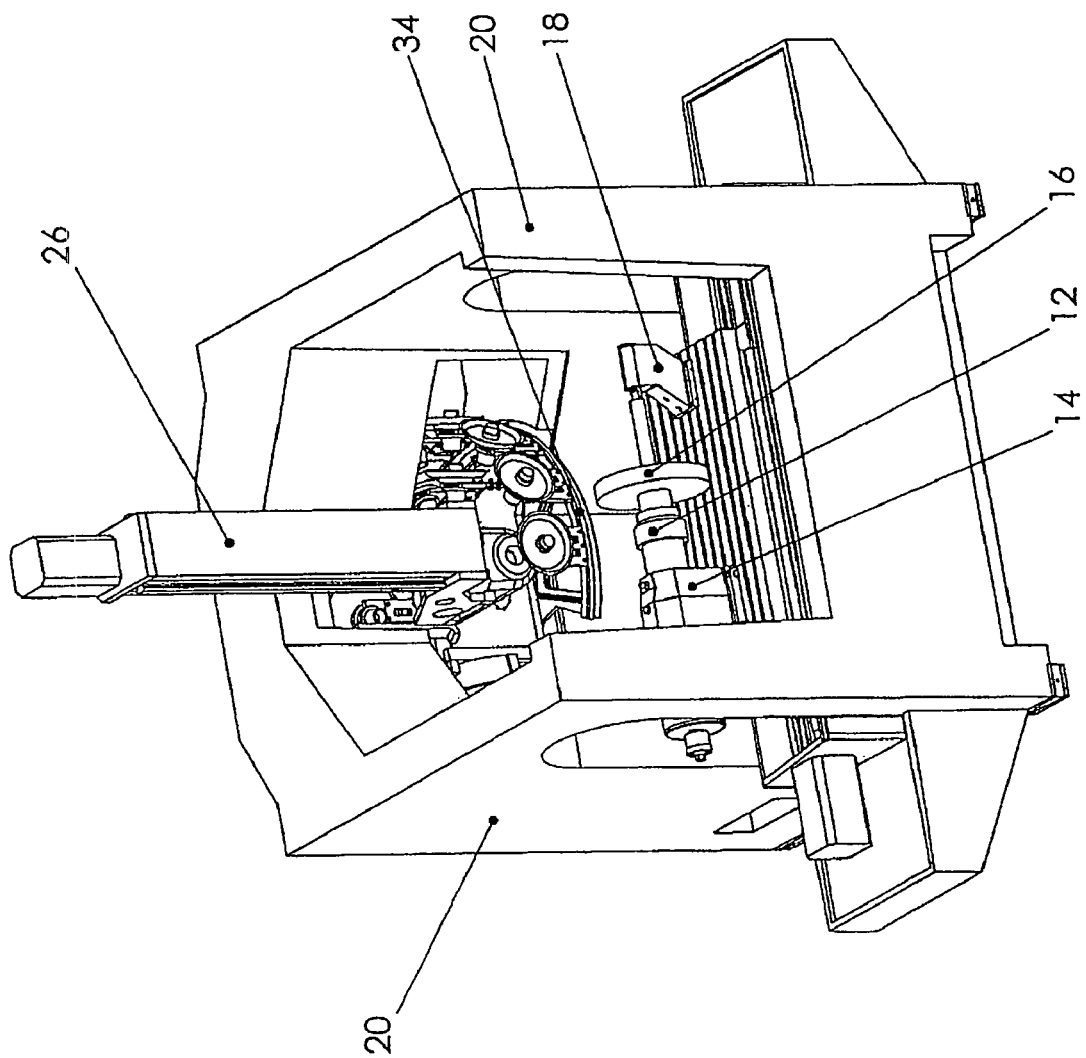
Figure 8:
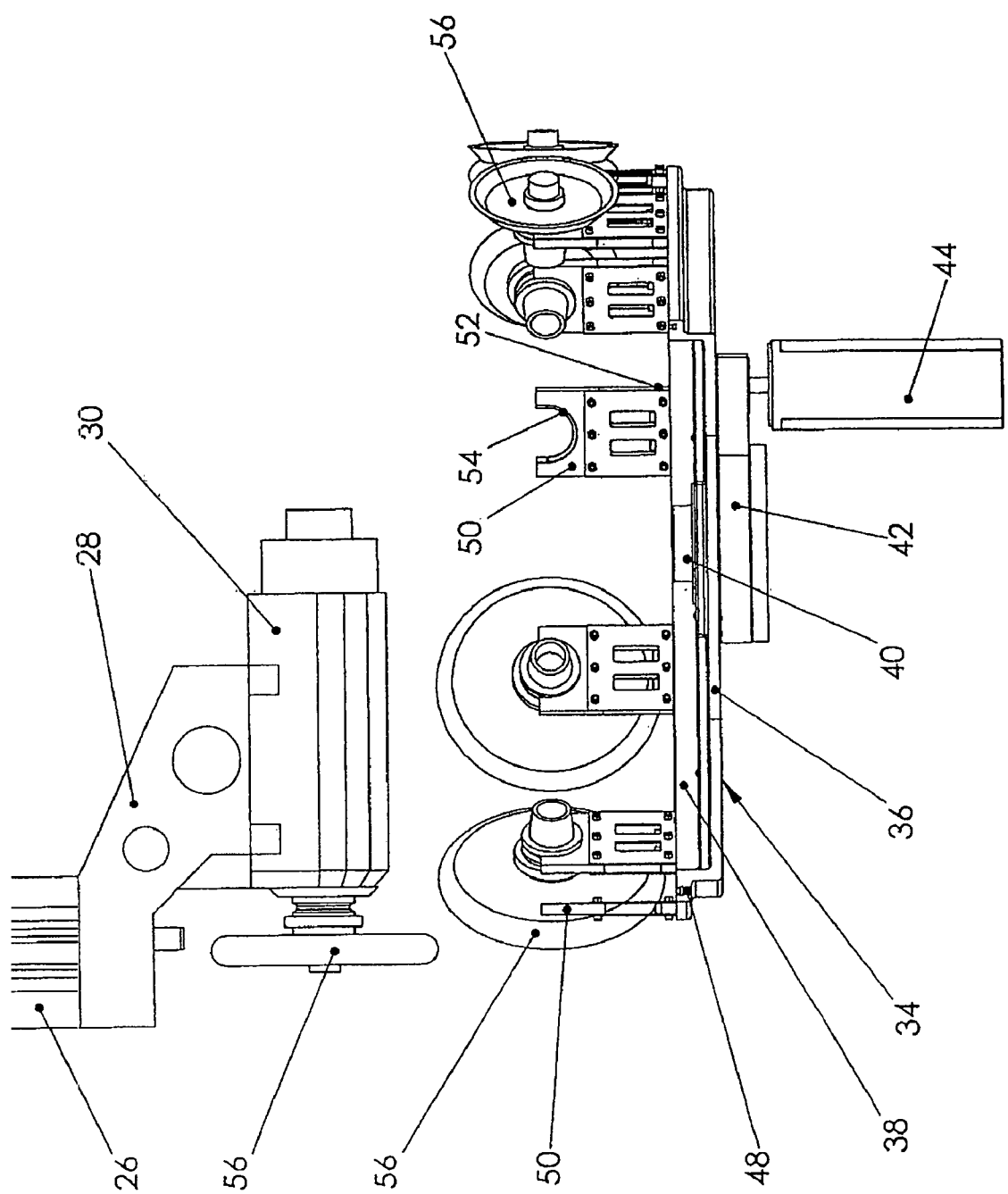
Figure 9:
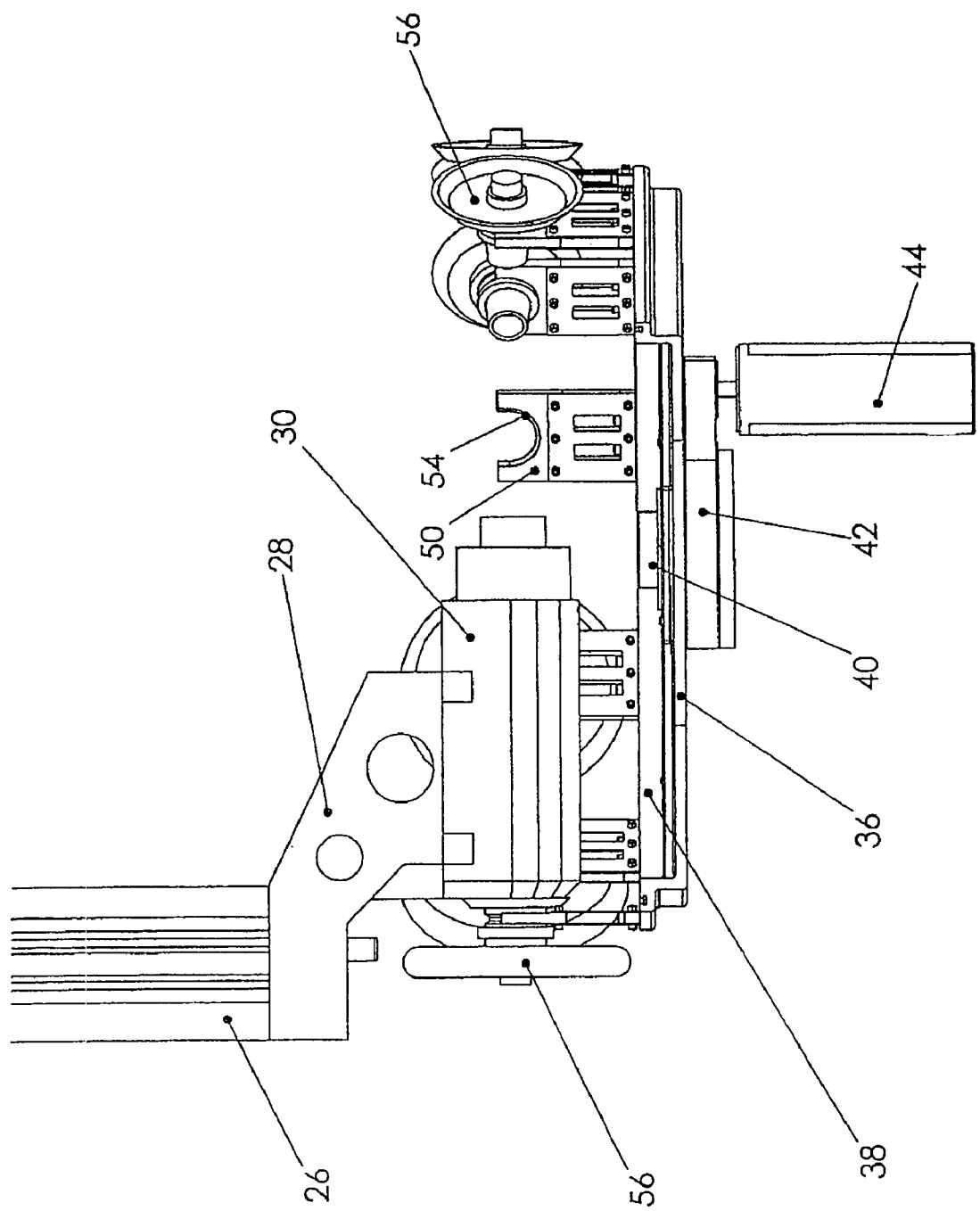
Figure 10:
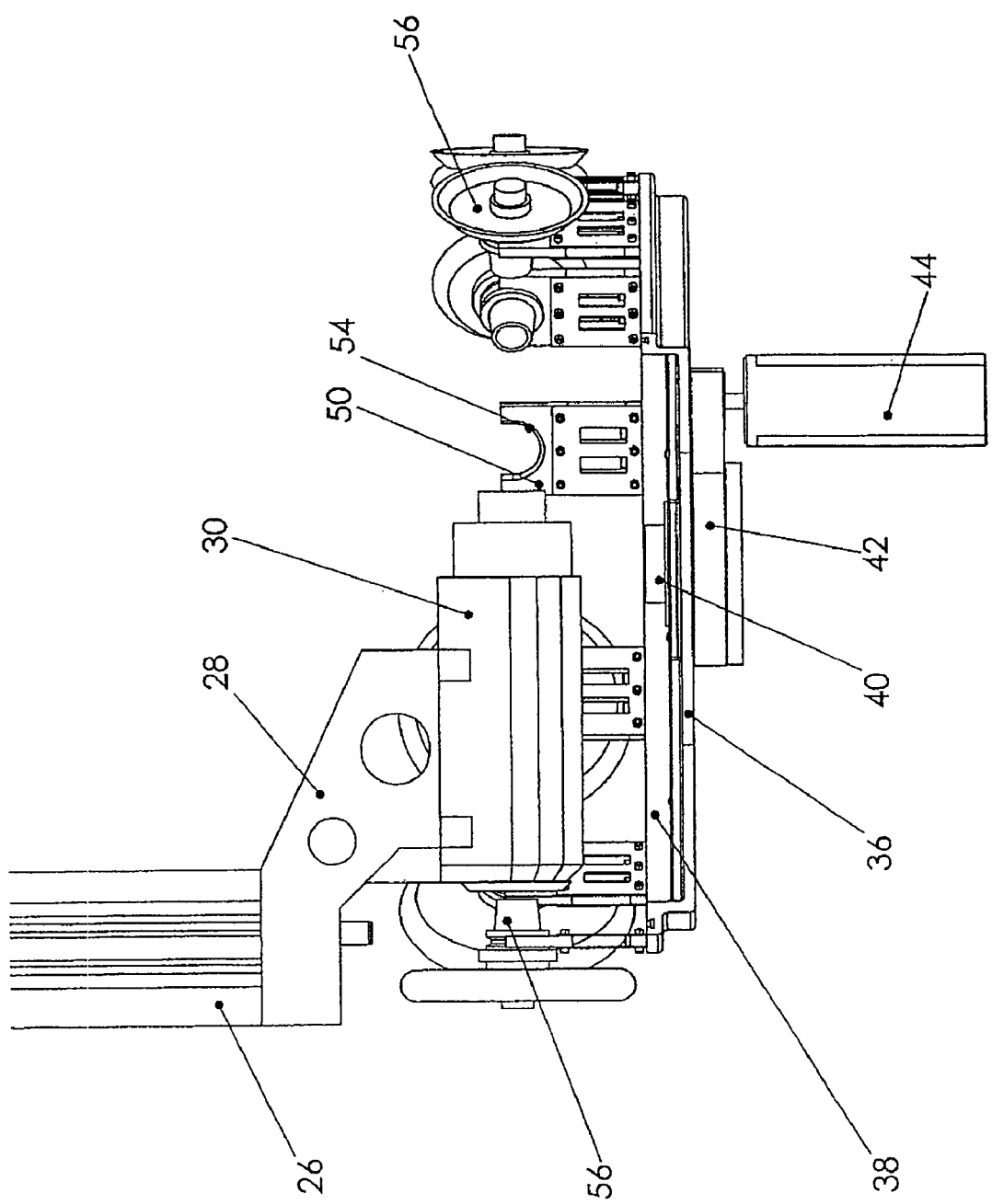
Figure 11:
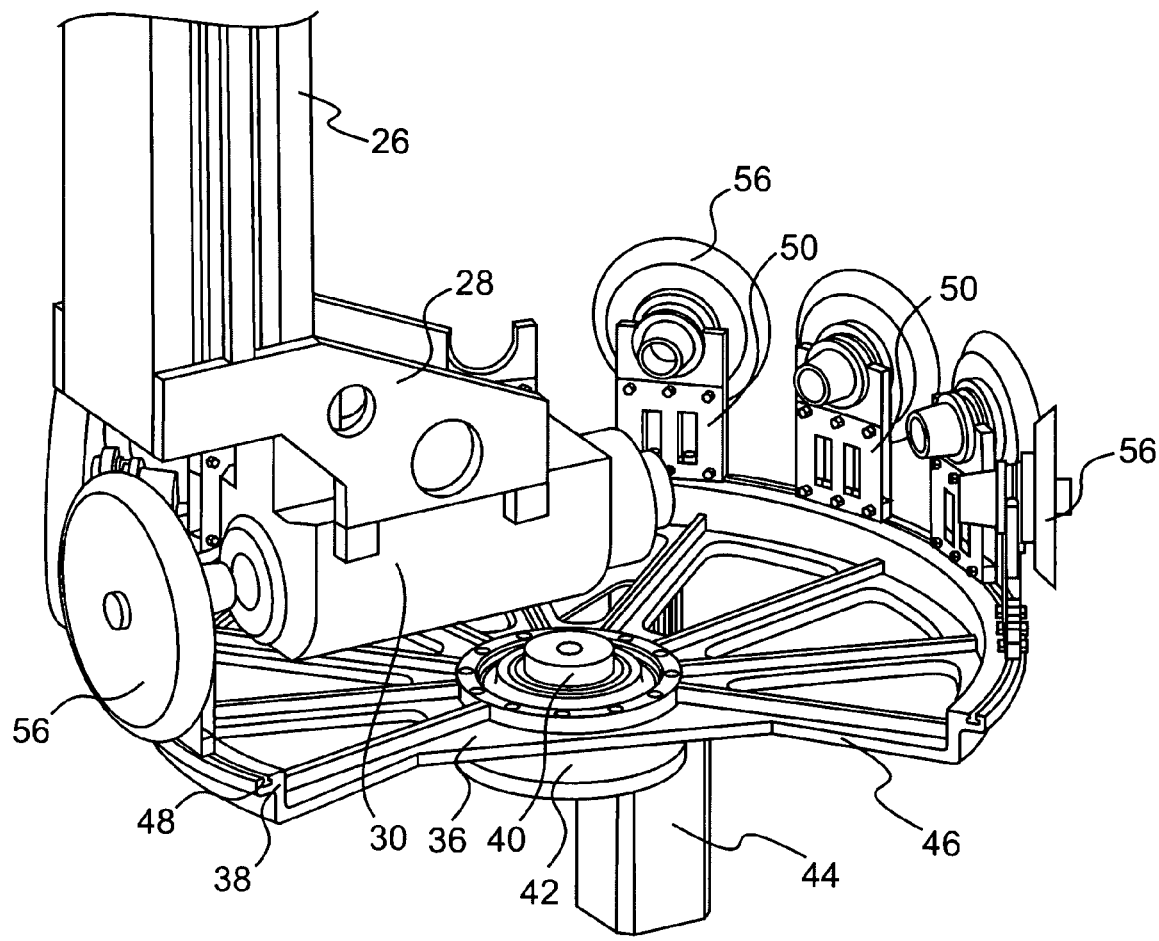

Below, the invention is described in greater detail using an exemplary embodiment illustrated by the drawings, which show FIG. 1 a machine tool in the operating position in perspective, FIG. 2 the same view of the machine tool without the tool spindle in the operating position, FIG. 3 the same representation of the machine tool without the tool spindle in the exchange position of an outer magazine wheel, FIG. 4 the same representation of the machine tool in the exchange position of the inner magazine wheel and the tool spindle, FIG. 5 the same representation of the machine tool with the tool spindle and an inner magazine wheel in the exchange position, FIG. 6 the same representation of the machine tool with the tool spindle, a grinding wheel on the outer magazine wheel and a grinding wheel protector of the inner magazine wheel in the exchange position, FIG. 7 the tool spindle and the outer magazine wheel in perspective detail, FIG. 8-10 the delivery of a tool from the tool spindle into the outer magazine wheel in side view, FIG. 11 the tool spindle and the outer magazine wheel after the delivery of the tool into the outer magazine wheel in perspective, FIG. 12 a perspective partial representation with the outer magazine wheel, the inner magazine wheel and the tool spindle, FIG. 13 an axial top view of the outer magazine wheel and the inner magazine wheel, FIG. 14-18 the delivery of a grinding wheel protector into the internal magazine wheel, FIG. 19-24 a simplified representation of the simultaneous mounting of a grinding wheel and a grinding wheel protector by the tool spindle.

In the embodiment shown, the machine tool is shown exemplarily as a grinding machine. It is readily evident and observable via the following description that the invention can also be used for other machine tools, especially drilling machines, milling machines and lathes.

As FIGS. 1 to 6 show, the machine tool has a horizontal machine bed 10, on which a work piece spindle 12 is mounted to be horizontally displaceable along the X-axis. The work piece spindle 12 is positioned horizontally along the X-axis and is rotatively powered by a work piece spindle drive 14. A work piece 16, which is possibly supported by a tailstock 183, can be clamped to the work piece spindle. Vertically upward directed side walls 20 are respectively positioned on both sides of the machine bed 10. A Y-guide rail 22 is located along the Y-axis on the horizontal top sides of each of the side walls 20. A bridge 24, which is displaceable along the Y-axis via a steered drive and which spans the work space of the machine tool between the side walls 20, is mounted on these Y-guide rails 22. A Z-slide 26, which is displaceable along the vertical Z-axis via a controlled drive and is rotatable about its vertical axis (C-axis) via a controlled drive, is mounted at the center in the bridge 24. At the lower end of the Z-slide 26, a support 28 is attached, on which a rotatively drivable tool spindle 30 with a horizontal axis, which is displaceable along the horizontal axis in a controlled manner, is mounted.

To this point, the construction of the machine tool corresponds to the machine tool described in the German patent application 10 2006 011 551.1 and reference is made to the entire content of this patent application for purposes of disclosure.

In FIG. 1, the tool spindle 30 is in the working position, in which a tool carried by the tool spindle 30 operates on the work piece 16. The tool is, for example, a grinding wheel for grinding the work piece 16. In FIG. 2, the bridge 24 and the Z-slide 26 with the tool spindle 30 are omitted to improve recognizability. It is evident that the working space is, e.g. polygonally, hollowed out from the back side opposite the operator side (the front in FIGS. 1 to 6) toward the rear in order to allow the horizontal tool spindle 30 to rotate about the vertical rotational axis (C-axis). The back side of the work space is enclosed by partitions 32 which can be moved away. The tool magazine, which is described below and in which the tools are stored and are pre-positioned for transfer into the tool spindle 30, is located behind these partitions 32.

FIGS. 7 to 11 show a simple design of the tool magazine.

The tool magazine has a magazine wheel 34, which is rotatatively driven under control about a vertical axis parallel to the Z-axis. The magazine wheel 34 consists of a circular magazine disk 36 lying in the horizontal plane, on whose outer circumference a magazine ring 38 pointing vertically upward is located. The magazine disk 36 can be designed as a closed disk, but is preferably configured as a disk with spokes, as shown in the drawing. The magazine disk 36 sits centrally on a vertical drive shaft 40, which is drivable below the magazine disk 36 by a toothed belt 42 of an NC controlled motor 44.

The magazine disk 36 and thus the entire magazine wheel 34 is configured with a segment-shaped cutout 46 over an angular interval. The shape of this cutout 46 corresponds to the polygonal shape of the partitions 32. If the magazine wheel 34 is aligned in its rotational position so that the cutout 46 faces the work space, then the partitions 32 can be moved into the closed position within this cutout 46. If the partitions 32 are moved back to their open position, the magazine wheel 34 can be rotated about its vertical axis and reaches into the work space of the machine tool with its periphery. These two positions are shown in FIGS. 2 and 3. The design of the magazine wheel 34 with the segment-like cutout 46 makes it possible to place the drive shaft 40 structurally close to the work area, which is hollowed out toward the back, so that the surface area of the machine tool is hardly increased by the tool magazine.

In the upper edge of the magazine ring 38, a coaxially circumferential T-groove is machined into the magazine ring 38. Tool holders 50, which are mounted on the magazine ring 38 with a foot 52 and fit in the T-groove 48, are assembled into this T-groove 48. With this foot 52, the tool holders 50 can be displaced in the T-groove in the circumferential direction of the magazine ring 38 and clamped in the desired position. The tool holders 50 point vertically upward from the foot 52 and each of them forms a U-shaped mounting 54 for a tool, which opens upward. The mountings 54 are configured according to the tools they are to receive. The present exemplary embodiment shows tools 56 in the form of grinding wheels, which have a standardized tapered shaft for a hollow tapered shaft tool mounting. The mounting 54 is configured so that the tool 56 can be placed into the mounting 54 from above, whereby the tool holder 50 fits with its mounting 54 in the gripping groove of the tapered shaft. The tool 56 is held securely in the mounting 54 by its own weight without additional fastenings, and latched against centrifugal forces and tilting effects. The tools 56 are assembled into the tool holders 50 so that their tapered shafts are directed radially inward from the magazine ring 38, while the actual tool is directed radially outward. Since the diameter of the actual tool is usually larger than the diameter of the tapered shaft, this results in an optimal utilization of space of the magazine periphery. The tool holders 50 can be displaced in the T-groove 48 in the circumferential direction of the magazine ring 38 and arranged with angular spacings so that optimal utilization of the periphery of the magazine wheel 34 is achieved, in accordance with the diameter of the respective tools 56. The tool holders 50 are clamped and fixed in the T-groove 48 of the magazine ring 38 in the respectively optimized angular positions. The positions of the tool holders 50 are stored as angular values in the controls of the motor 44 and can be changed and adjusted according to the respective application.

The tool change is described using FIGS. 7 to 11.

Figure 7:
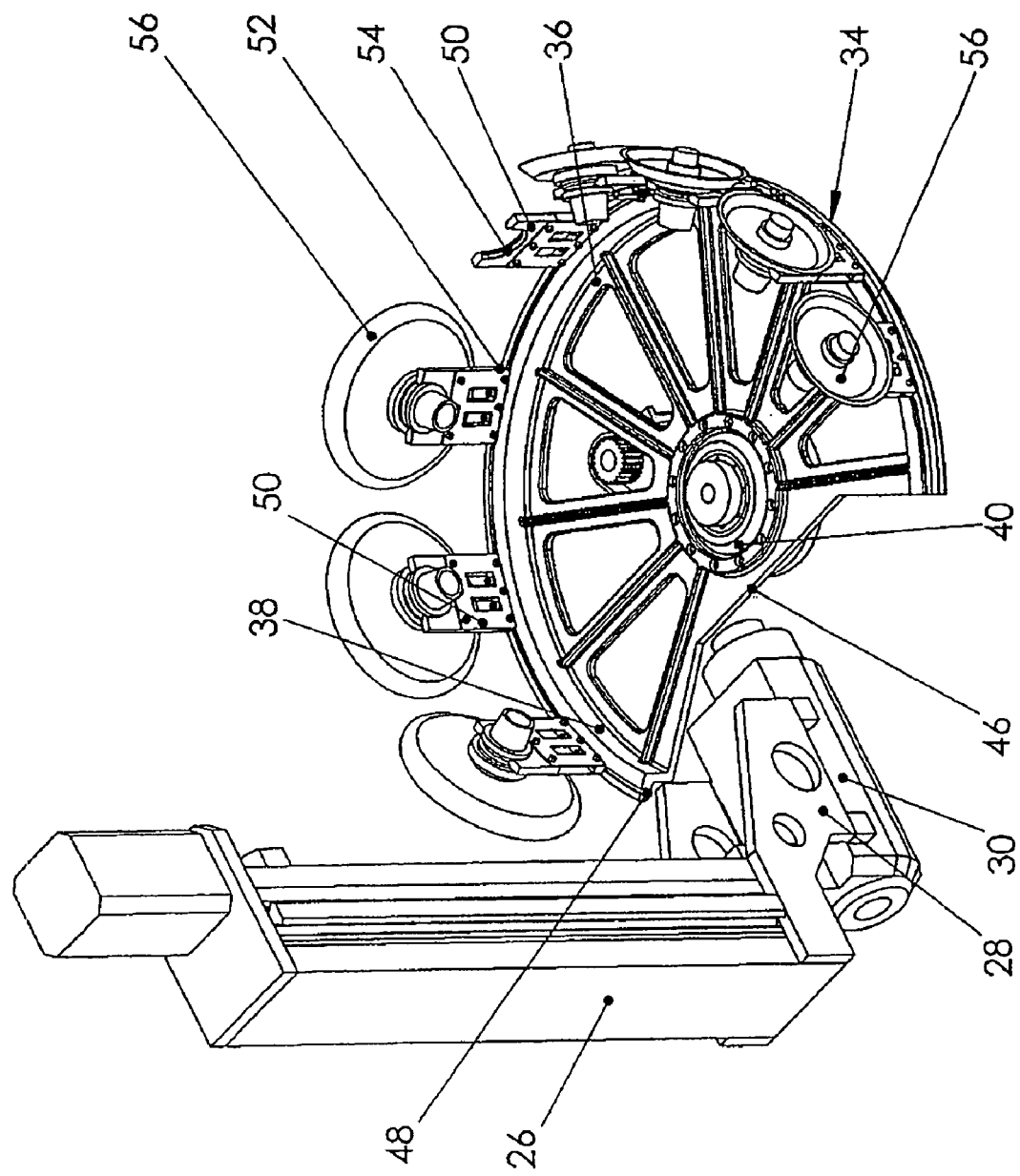

FIG. 7 shows the operating position of the machine tool. The magazine wheel 34 is in the position shown in FIG. 2, in which the cutout 46 coincides with the position of the partitions 32. In the region of this cutout 46, the magazine wheel 34 is shielded from the work space by the partitions 32, not shown in FIG. 7. The processing of a work piece 16 can be accomplished. The work piece 16 is moved on the machine bed 10 along the x-axis, while it can also possibly be turned around its own axis (A-axis). The tool 56 is clamped in the tool spindle 30. The tool 56 undergoes a vertical movement by means of the Z-slide 26, while the horizontal axis of the tool spindle 30 is rotatable around the vertical axis of the Z-slide 26. The Z-slide 26 can be moved along the Y-axis by means of the bridge 24. The tool spindle 30 can additionally be moved horizontally in the support 28, along its axis, with respect to the Z-slide 26. If necessary, the angle of inclination of the axis of the tool spindle 30 can also be additionally adjusted with respect to the horizontal plane.

To accomplish a tool exchange, the partitions 32 are first moved away so that the magazine wheel 34 can turn into the work space. As FIG. 8 shows, the magazine wheel 34 is turned via the drive control of the motor 44, so that a free tool holder 50' is carried into the exchange position, i.e. positioned in the plane of Y-motion of the Z-slide 26. The Z-slide 26 is turned so that the support 28 with the tool spindle 30 is likewise aligned in this plane. The bridge 24 now moves to the rear along the Y-axis until the tool spindle 30 is located above the magazine wheel 34 and within the circumference of the magazine ring 38, as shown in FIG. 3. The z-slide 26 is then moved vertically downwards, whereby the tool 56 is placed into the mounting 54 of the open tool holder 50' with its gripping groove as shown in FIG. 9. Thereafter, the Z-slide 26 drives further to the rear along the Y-axis, whereby the tool spindle 30 is moved radially inward by the magazine ring 38 and the HSK mounting of the tool spindle 30 releases the tapered shaft of the tool 56 as shown in FIGS. 10 and 11. Alternatively to a displacement of the Z-slide 26 along the Y-axis, it is also possible to move the tool spindle 30 in the support 28. In the position shown in FIGS. 10 and 11, the magazine wheel 34 can now be turned via the motor 44, until the next selected tool 56 is radially positioned in the exchange position in front of the tool receptacle of the tool spindle 30. In this position, the tool spindle 30 is again pushed radially outward by means of the Z-slide 26, whereby its tool receptacle shifts itself onto the tapered shank of the now positioned next tool and clamps onto the latter. The tool spindle 30 with the next clamped tool 56 is now moved upward by means of the Z-slide 26, whereby the tool 56 is lifted out of the tool holder 50. As soon as the tool spindle 30 with the tool 56 is located above the magazine ring 38, the tool spindle 30 again can be moved into the operating position. The magazine wheel 34 is again turned back to the initial position shown in FIGS. 2 and 7, the partitions 32 are closed and the processing of the work piece 16 with the new tool 56 can begin.

Figure 12:
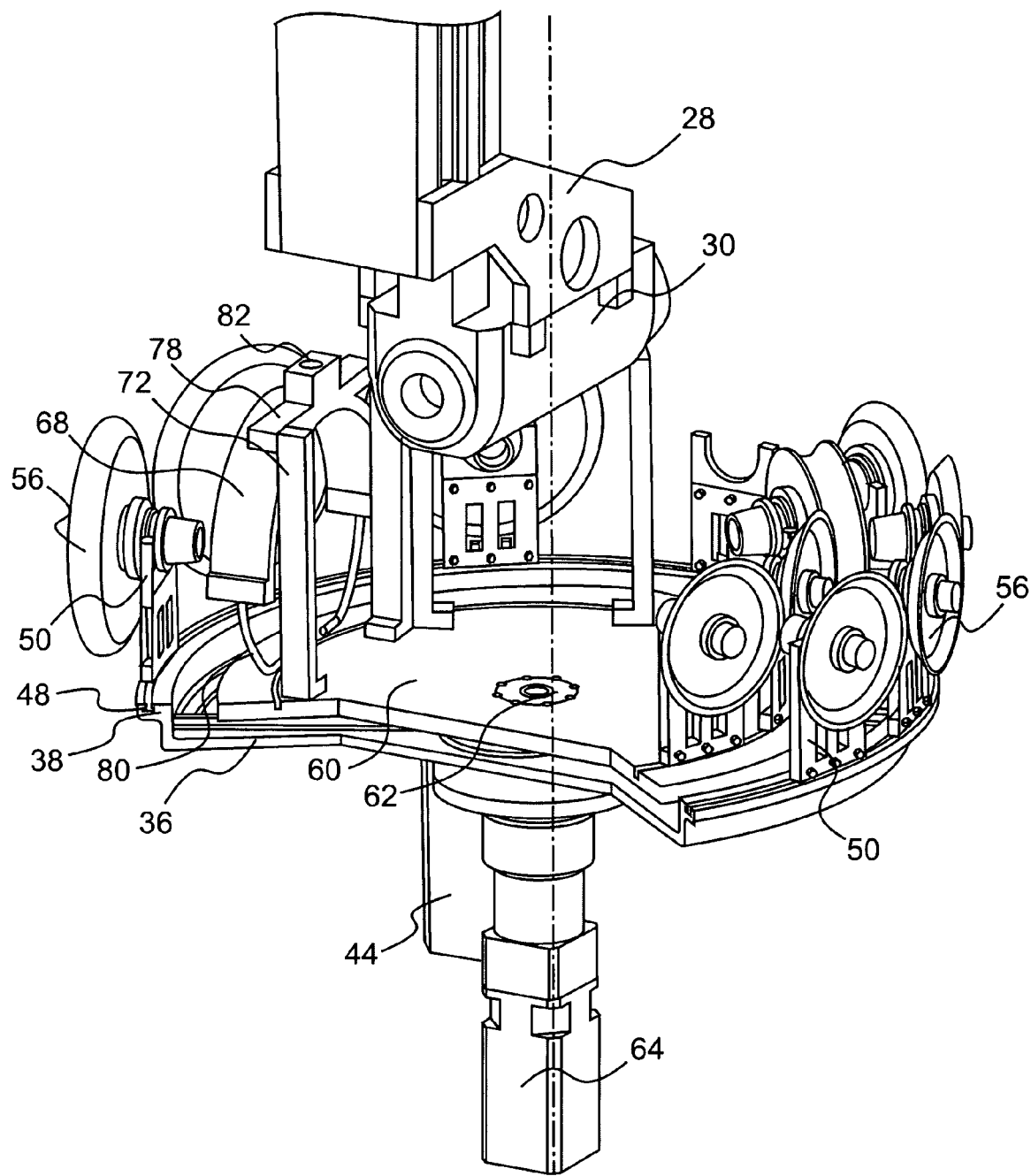
Figure 13:
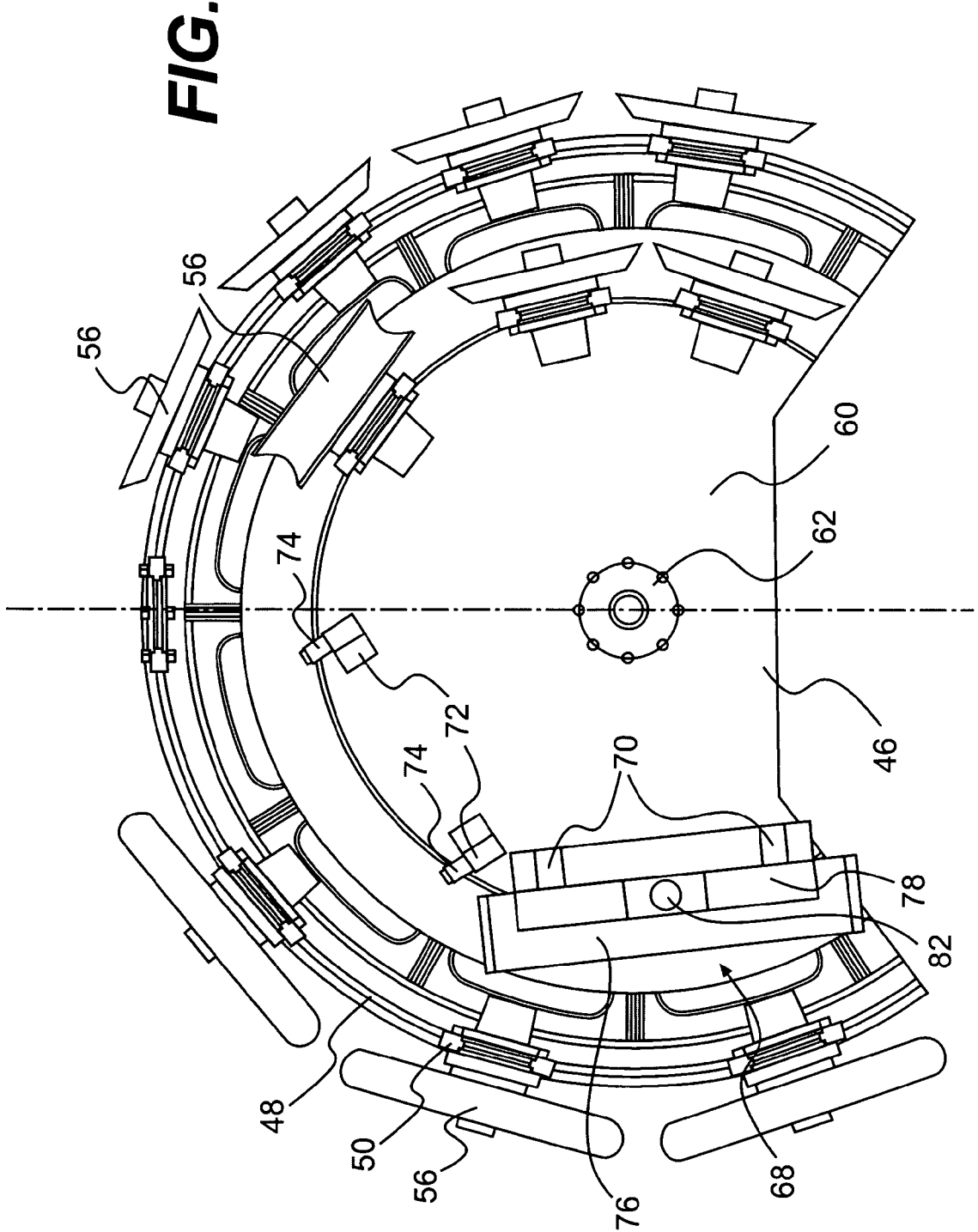

The tool magazine furthermore has a second inner magazine wheel 58 in addition to the first outer magazine wheel 34, as shown in particular in FIGS. 12 and 13.

The inner magazine wheel 58 is disposed coaxially with the outer magazine wheel 34 and has a magazine disk 60, which is positioned concentrically and in parallel with the magazine disk 36 of the outer magazine wheel 34. The outside diameter of the magazine disk 60 is smaller than the inside diameter of the magazine ring 38 of the outer magazine wheel 34. The inside magazine wheel 58 is freely rotatable with respect to the outer magazine wheel 34. For this purpose, the magazine disk 60 of the inner magazine wheel 58 has a vertical central drive shaft 62, which is mounted in a coaxially rotatable manner in the drive shaft 40 of the outer magazine wheel 34 configured as a hollow shaft. The inner magazine wheel 58 is drivable via its drive shaft 62 independent of the outer magazine wheel 34, by means of an NC controlled motor 64 located below the outer magazine wheel 34.

Figure 5:
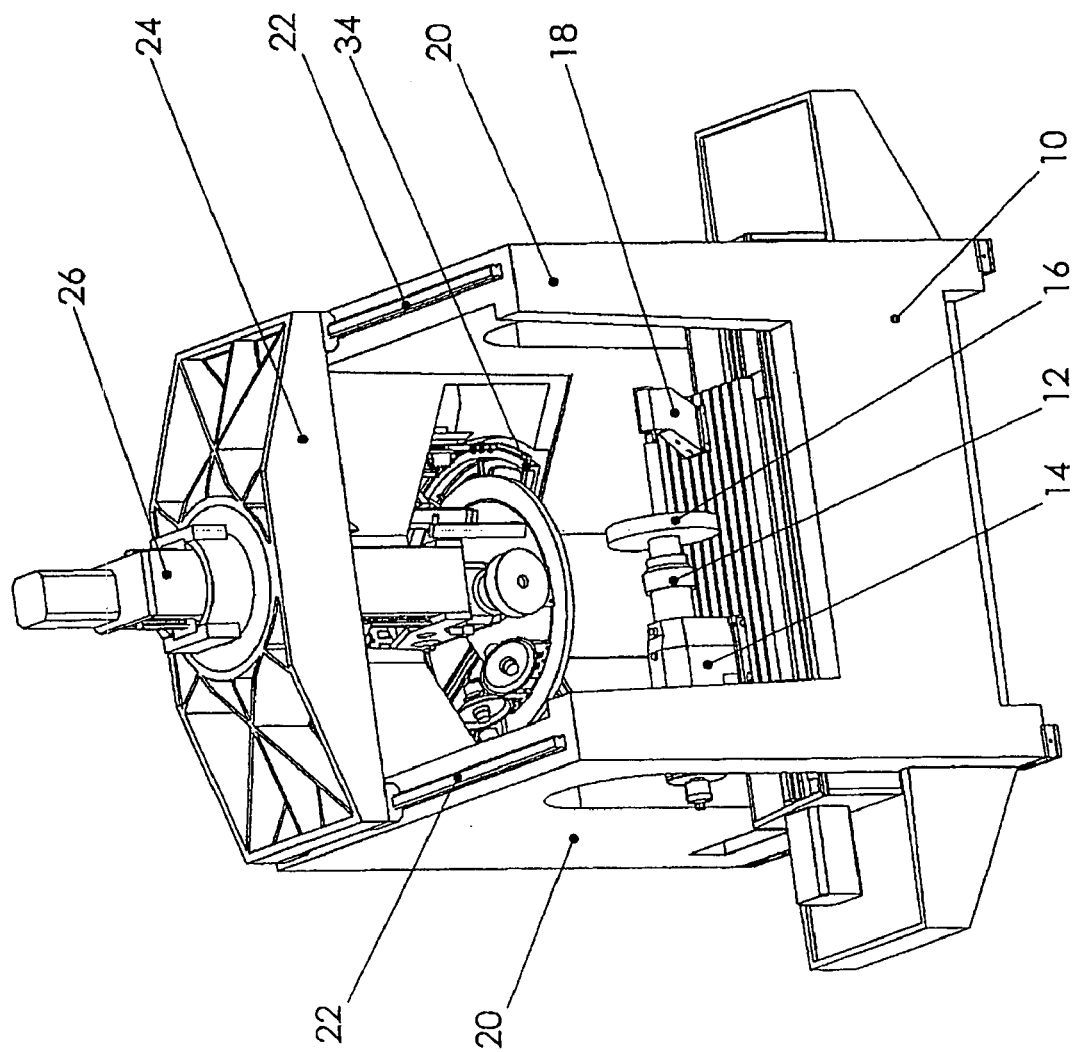
Figure 6:
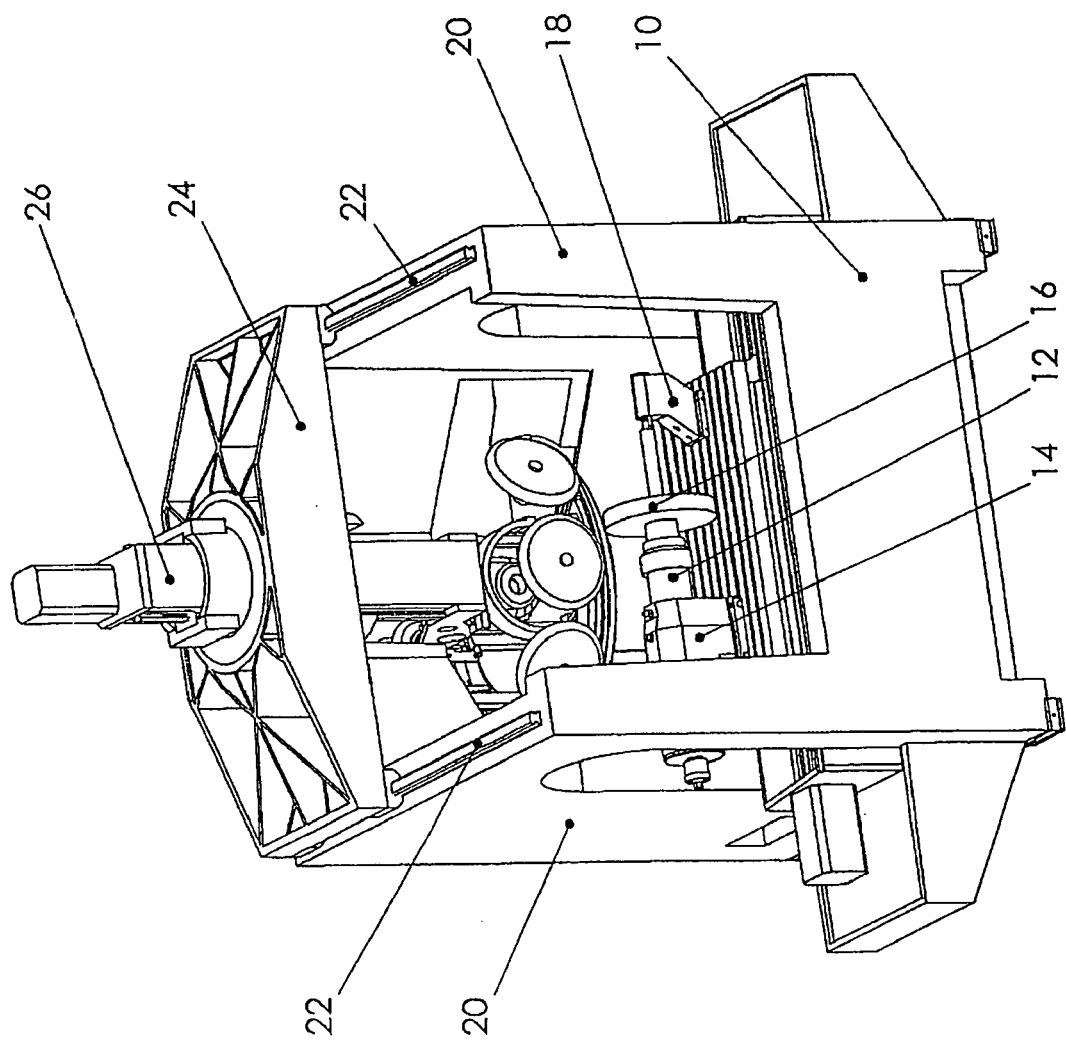

As FIG. 5 shows, the inner magazine wheel 38 can be essentially configured similar to the outside magazine wheel 34. A magazine ring, in which tool holders can be arranged in their adjustable angular positions and clamped, runs concentrically on the top side of the magazine disk 60. The magazine ring and the tool holders can be designed in a corresponding manner, as described above for the outer magazine wheel 34. The magazine ring with the tool holders is however—as FIG. 5 shows—designed with a smaller radius than the magazine disk 60, so that a radial distance remains free between the magazine ring of the inner magazine wheel 58 and the magazine ring 38 of the outer magazine wheel 34, which is required for mounting the tools 56 stored in the inner magazine wheel 58.

The withdrawal and delivery of the tools 56 into the inner magazine wheel 58 occurs in the same manner as described above for the outer magazine wheel 34. The inner magazine wheel 58 also has a cutout 46, which is congruent with the cutout 46 of the outer magazine wheel 34 during an angular alignment of the outer magazine wheel 34 with the inner magazine wheel 58. In particular, the magazine ring of the inner magazine wheel 58 also has a corresponding angular cutout, so that, by means of this cutout in the magazine ring of the inner magazine wheel 58, the tools 56 in the outer magazine wheel 34 are freely accessible to the tool spindle 30 in the manner described above.

Because of the independently controlled adjustability of the rotary positions of the outer magazine wheel 34 and the inner magazine wheel 58, they can be independently brought into the exchange position, and tools 56 can be alternatively exchanged into and from the outer magazine wheel 34 or the inner magazine wheel 58 in an arbitrarily programmable manner. The inner magazine wheel 58 thus increases the number of the tool storage places of the entire tool magazine without increasing the external dimensions of the tool magazine.

A particular use of the inner magazine wheel 58 is shown in FIGS. 12 and 13. In this embodiment, the tool magazine serves the purpose of holding both machining tools 56, especially grinding wheels, and associated safety devices, in particular grinding wheel protectors, at the ready for exchanging one for the other. As FIGS. 12 and 13 show, in this embodiment, the tools 56 are held at the ready in the manner described above, in the outer magazine wheel 34. The inner magazine wheel 58 carries the safety devices, which are in particular in the form of grinding wheel protectors.

FIGS. 14 to 18 show the exchange of such a grinding wheel protector 68. For purposes of greater intelligibility, only the inner magazine wheel 58 of the complete magazine shown in FIGS. 12 and 13 is shown, while the outer magazine wheel 34 is omitted.

On the magazine disk 60 of the inner magazine wheel 58, protector mountings 70 are attached to the periphery with radial spacing and angularly distanced from each other on a concentric circle. The protector mountings 70 respectively consist of a pair of support arms 72 extending vertically upward from the magazine disk 6Q, which arms exhibit a mounting mandrel 74 directed radially outward at their respective free upper ends. The distance between the respective two support arms 72 of a protector mounting 70 and the positioning of their mounting mandrels 74 is selected so that a grinding wheel protector 68 can be slid onto these mounting mandrels 74 and carried by them. The grinding wheel protector 68 consists of a protective cover 76, which partly covers the outer circumference of the grinding wheel, a mounting bracket 78 attached on top of the protective cover 76 and possibly coolant nozzles 80. The mounting bracket 78 extends horizontally and essentially tangential to the protective cover 76. Drilled holes for mounting mandrels 74 are provided at both ends of the respective mounting bracket 78. A vertical coupling hole 82 is provided in the center of the top of the mounting bracket 78. A coupling stud 84 extending downward is located on the support 28 of the Z-slide 26 in front of the tool receptacle of the tool spindle 30, which stud cooperates with the coupling hole 82 for purposes of anchoring the grinding wheel protector 68.

Figure 2:
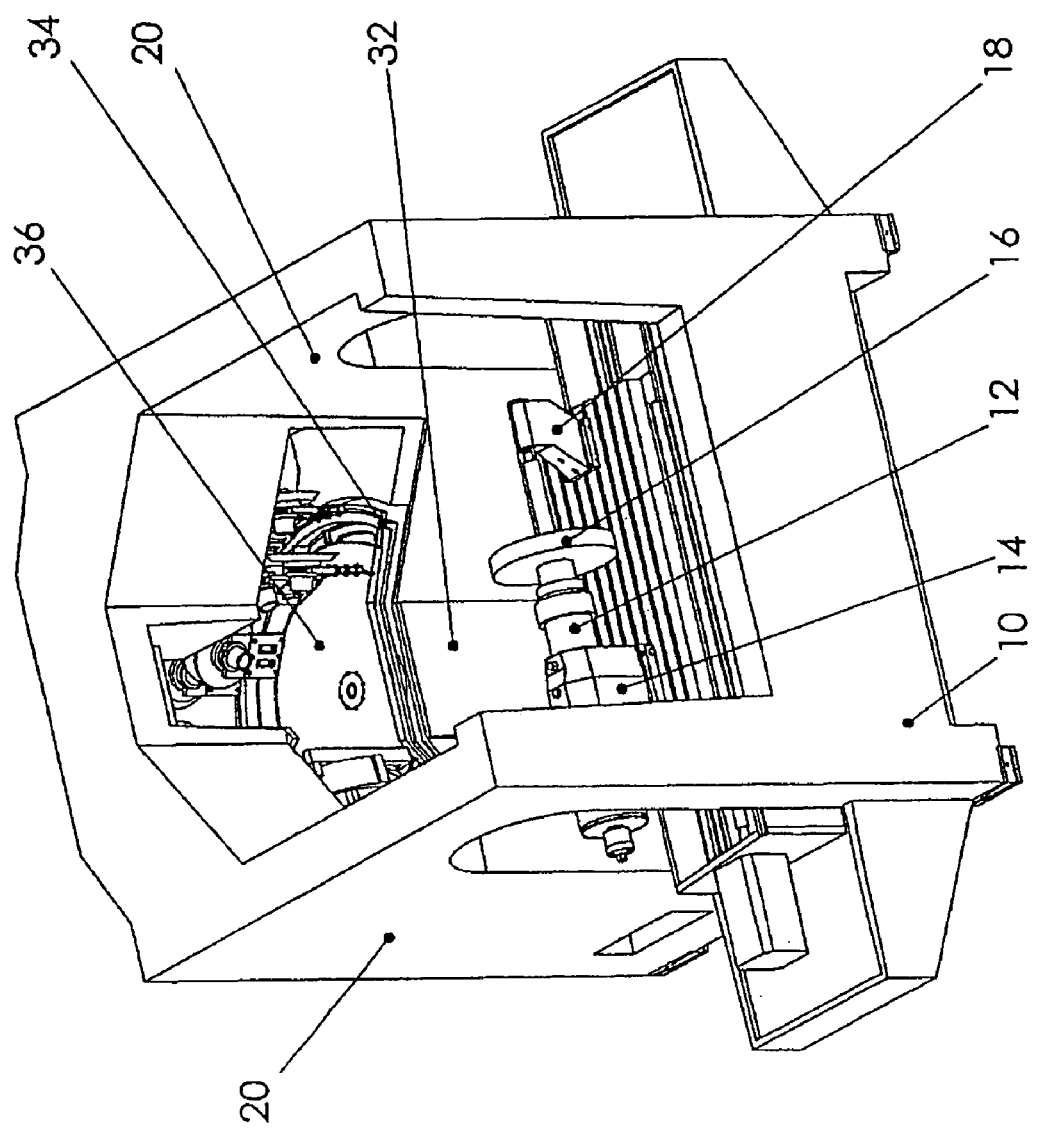
Figure 14:
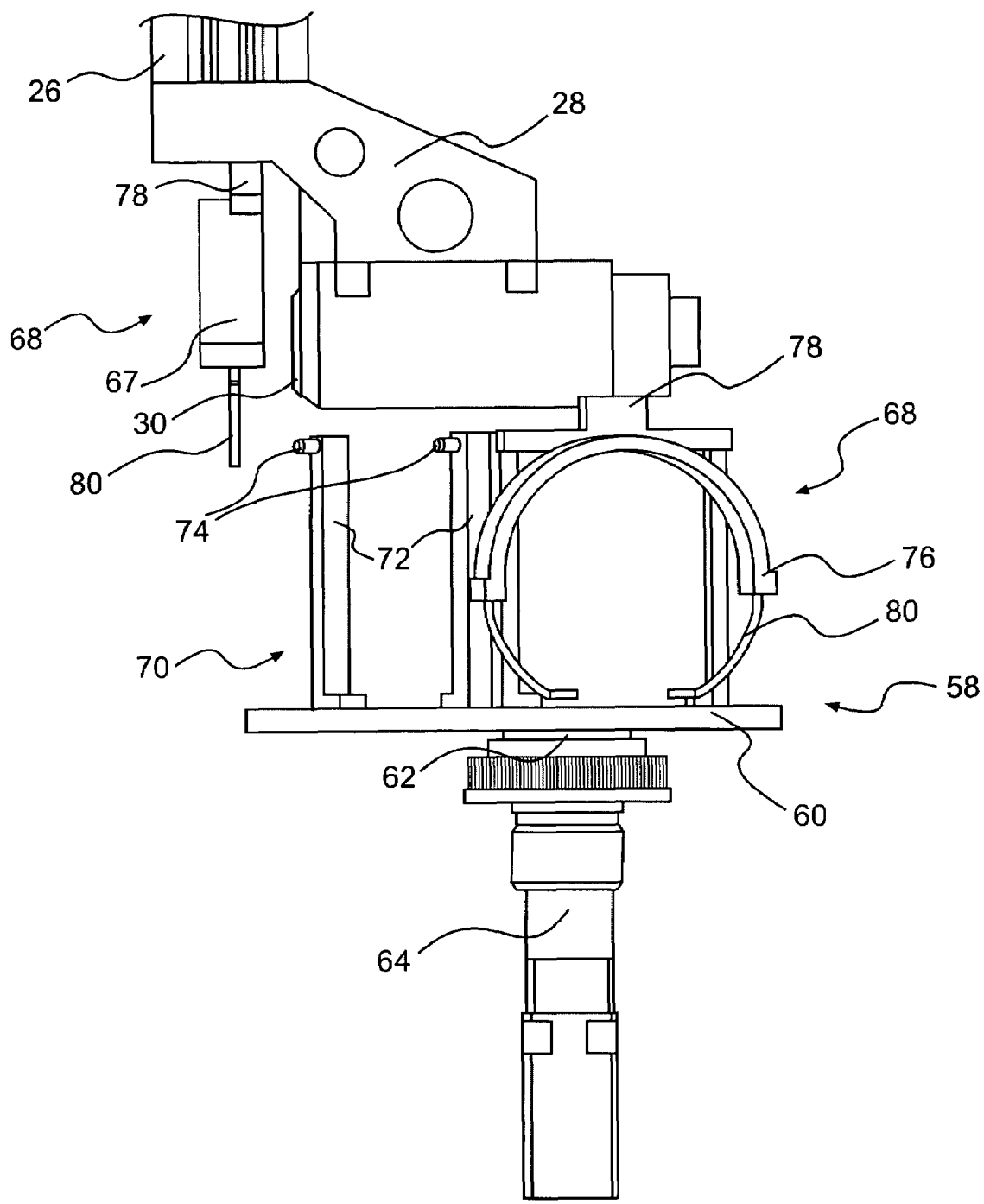

FIG. 14 shows the operating position, in which, according to FIGS. 1 and 2, the grinding wheel protector 68 is locked on the support 28 and covers the grinding wheel, not shown in FIG. 14, with its protective cover 76. A coolant is sprayed onto the work piece which 16 is to be machined by means of the coolant nozzles 80. The magazine wheel 58—like the outer magazine wheel 34 which is not shown—is in the initial position, in which the cutout 46 is covered by the closed partitions 32.

Figure 15:
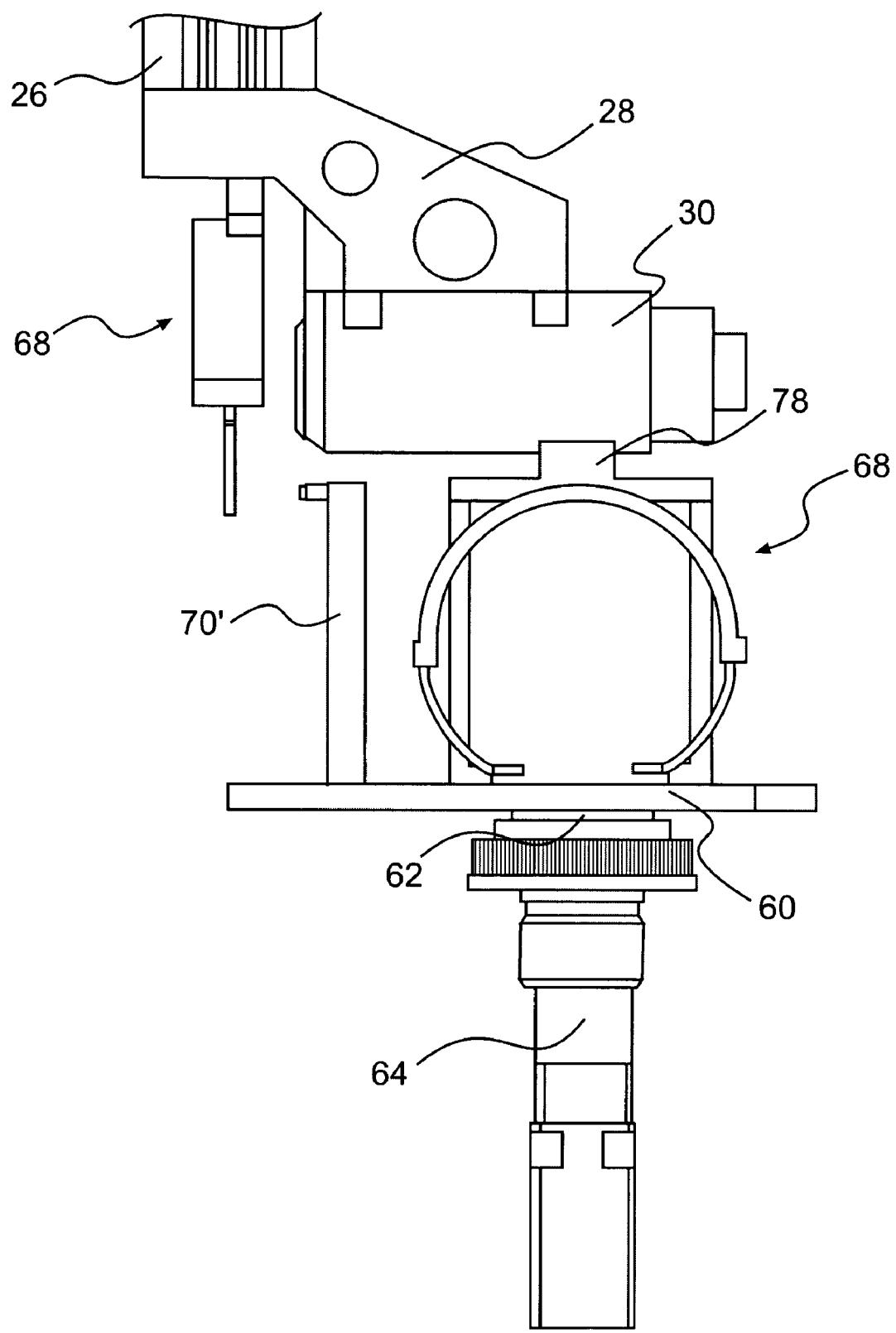

To exchange the grinding wheel protector 68, the internal magazine wheel 58 is turned into the exchange position shown in FIG. 15, after the partitions 32 are opened, in which position a free protector mounting 70' faces the work space and is aligned in the Y-Z-plane of the Z-slide 26.

Figure 16:
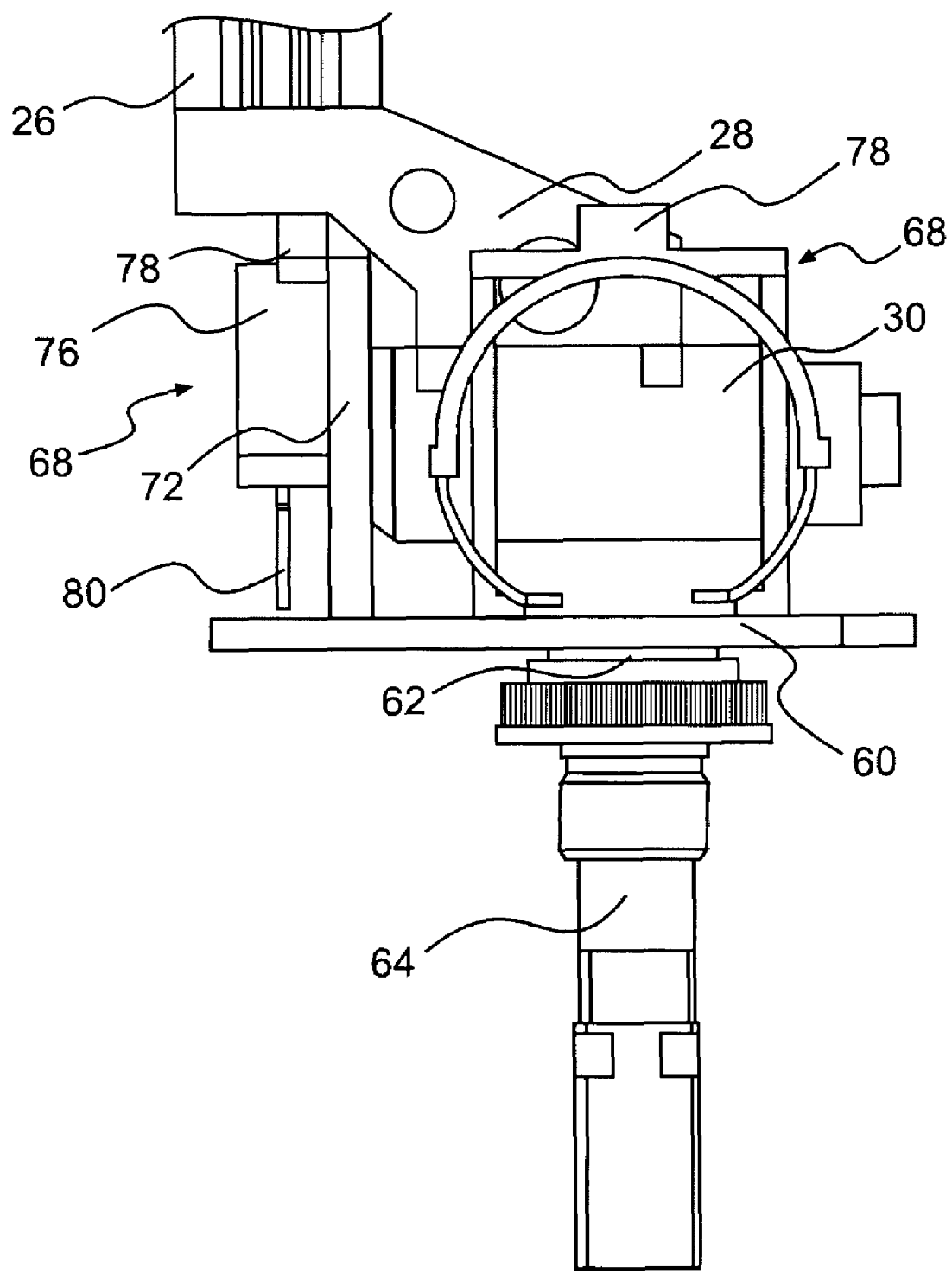

In this position of the magazine wheel 58, the Z-slide 26 is also lowered along with the tool spindle 30 aligned in the Y-Z-plane, until the grinding wheel protector 68 which is locked on the support 28 is aligned in front of the free protector mounting 70'. The Z-slide 26, along with the support 28, is moved to the rear, i.e. to the right in FIG. 16, whereby the mounting bracket 78 of the grinding wheel protector 68 is pushed onto the mounting mandrels 74 of the open protector mounting 70'. This position is shown in FIG. 16.

Figure 17:
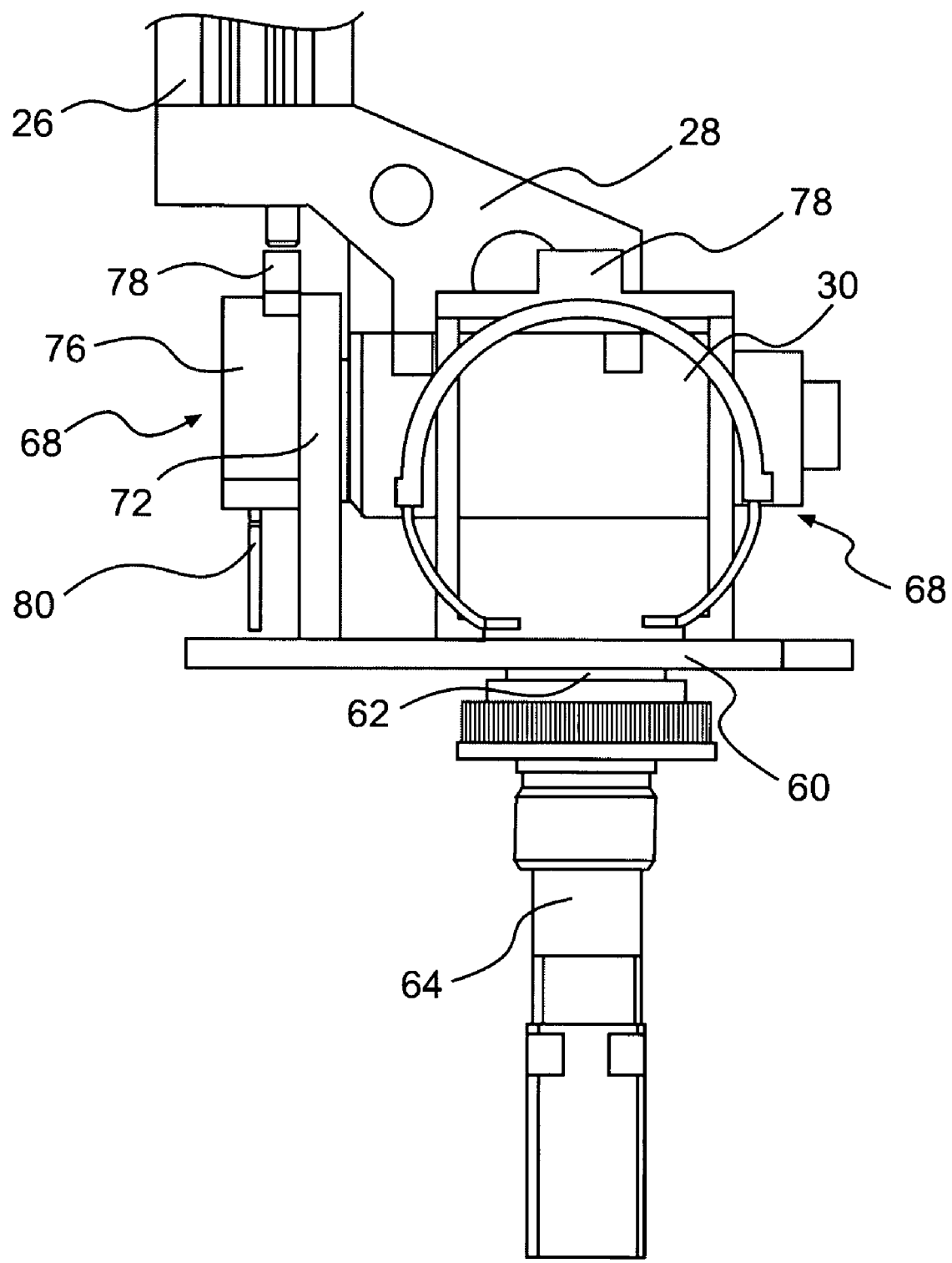
Figure 18:
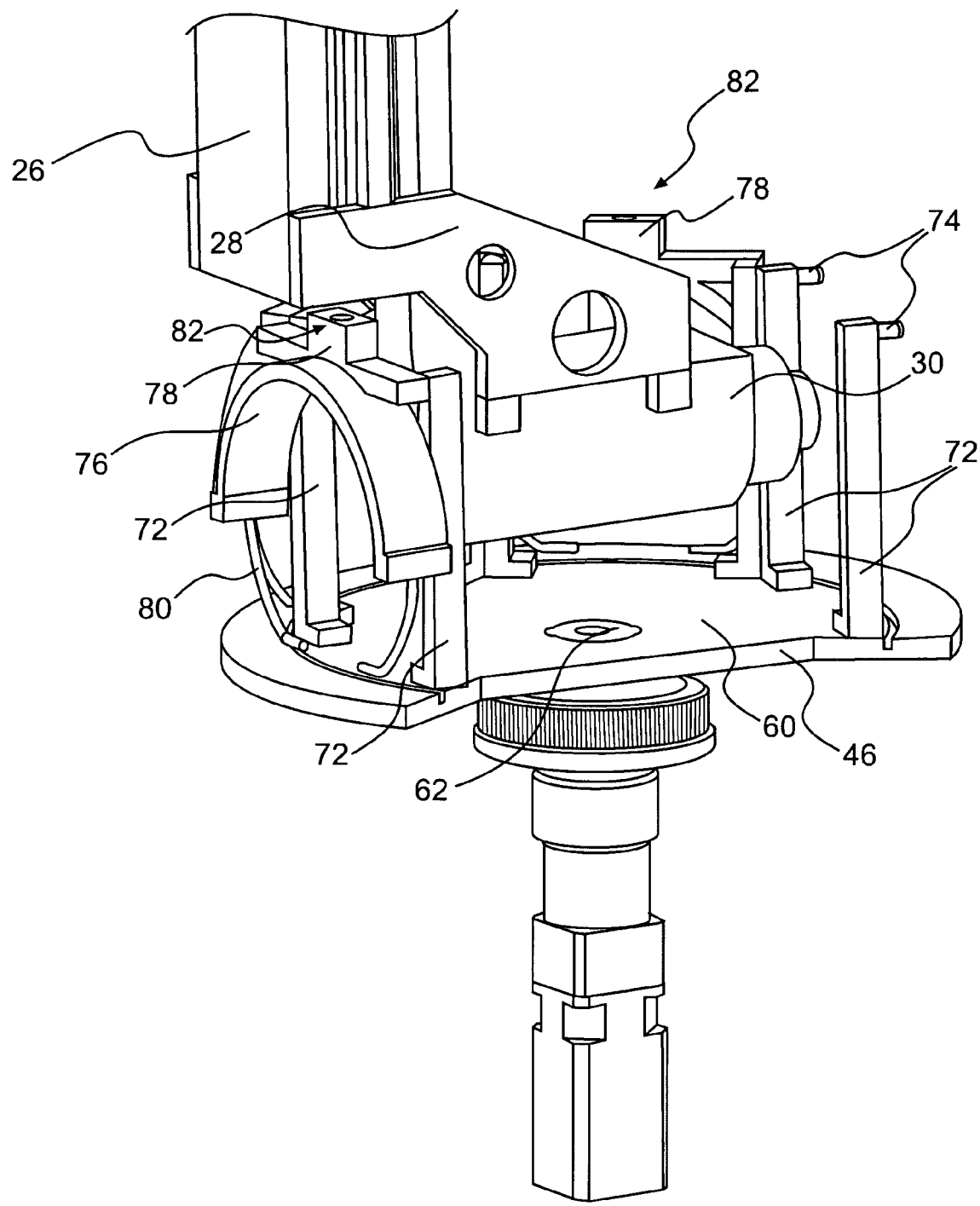

Thereafter, the Z-slide 26 is moved upward vertically, whereby the coupling stud 84 is pulled out of the coupling hole 82 of the grinding wheel protector 68 now sitting in the protector mounting 70. This is shown in FIGS. 17 and 18.

The magazine wheel 58 can now be turned with the tool spindle 30 relative to the support 28 in order to position a grinding wheel protector 68, which is to be subsequently exchanged, into the exchange position in front of the tool spindle 30. Once this has occurred, the support 28 along with the coupling stud 84 is again lowered to couple the now positioned grinding wheel protector 68 which is to be newly exchanged with the support 28. Thereafter the Z-slide 26 along with the support 28 is radially shifted forward, i.e. to the left in the drawing, in order to pull the coupled grinding wheel protector 68 from the mounting mandrels 74, so that the tool spindle 30 can now operate with the newly coupled grinding wheel protector 68.

It is immediately evident from FIGS. 12 and 13 that, due to the ability to rotate the first magazine wheel 34 and the second magazine wheel 58 in an independently controlled manner, the tools 56 and the protector device 68 can be exchanged independently. By this means, different tools 56 can be combined at will with different protector devices 68. If a tool must be replaced with a similar new tool, e.g. as a result of wear, it is possible to exchange only the tool, while the grinding wheel protector does not have to be exchanged.

FIGS. 19 to 24 finally show how a simultaneous exchange of a tool 56 and an associated protector device, e.g. a grinding wheel protector 68, can take place. For purposes of a simple and clear representation, only one tool 56 is shown in the outer magazine wheel 34 and one grinding wheel protector 68 in the inner magazine wheel 58. The remaining tools and grinding wheel protector devices are omitted.

Figure 19:
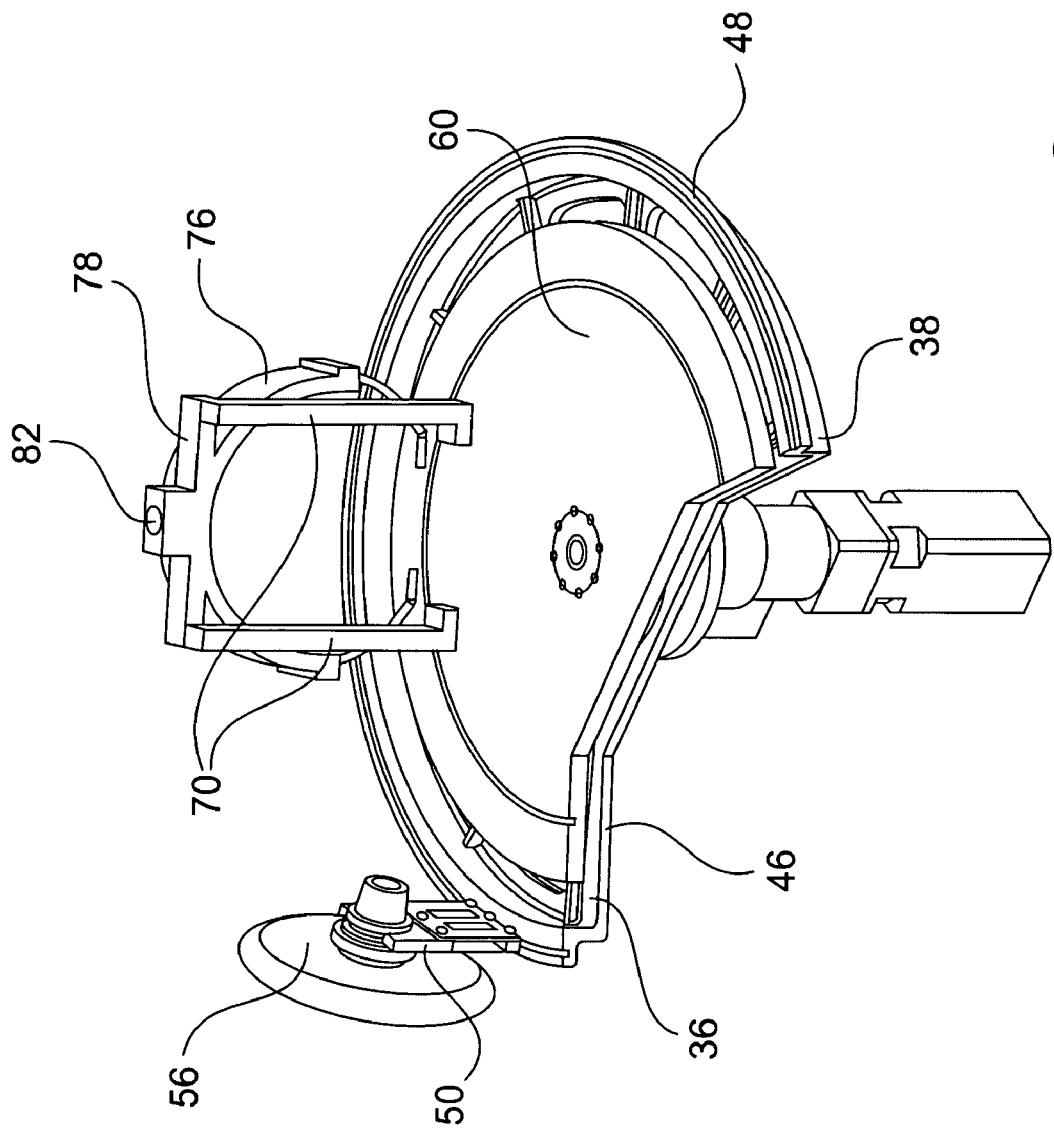
Figure 20:
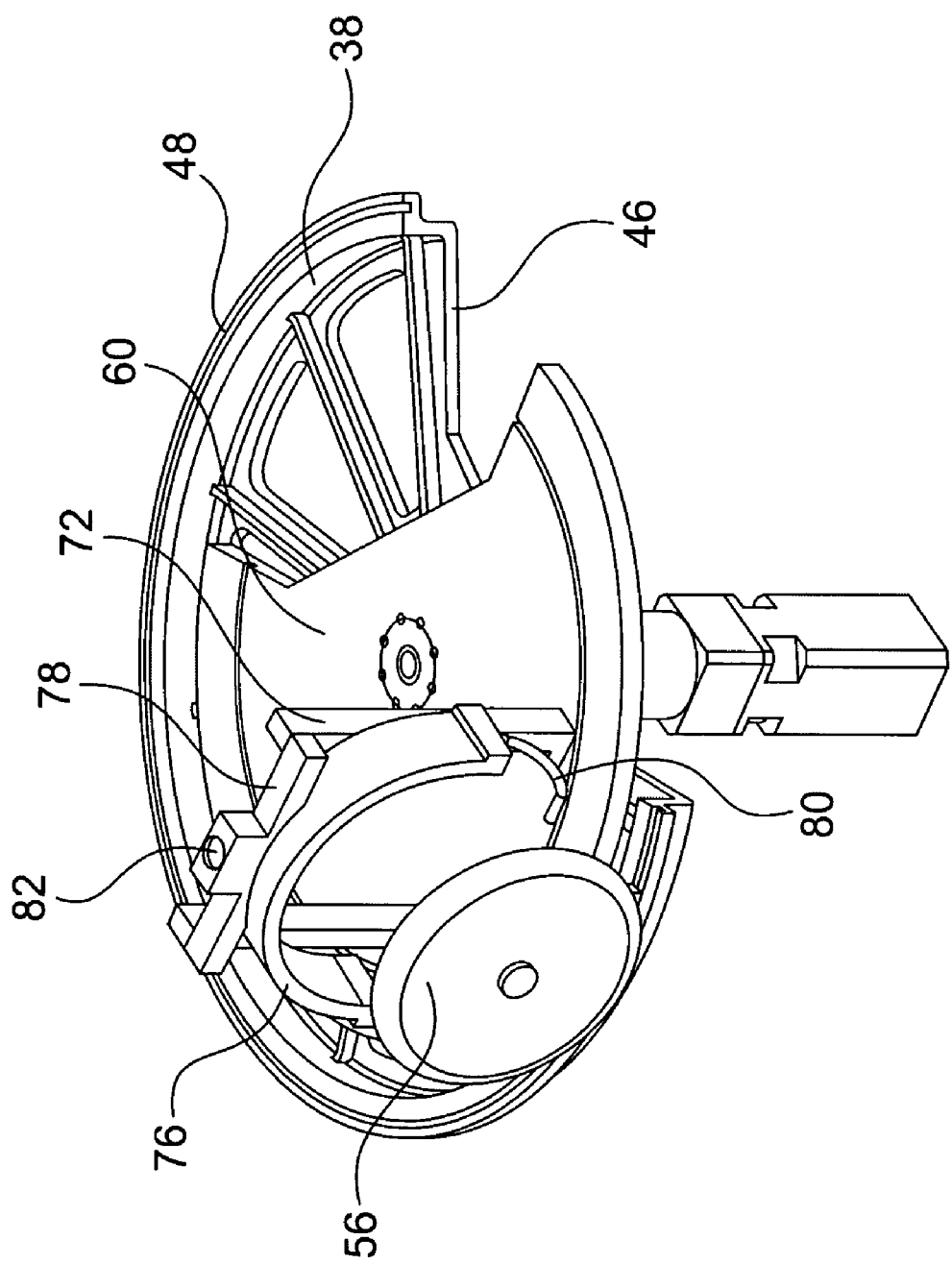

FIG. 19 shows the initial position, during the work piece processing time. After completion of the processing and after opening the partitions 32, the tool 56 and the associated grinding wheel protector 68, which are to be exchanged, are positioned in the radially aligned change position directed toward the work space, as shown in FIG. 20.

Figure 21:
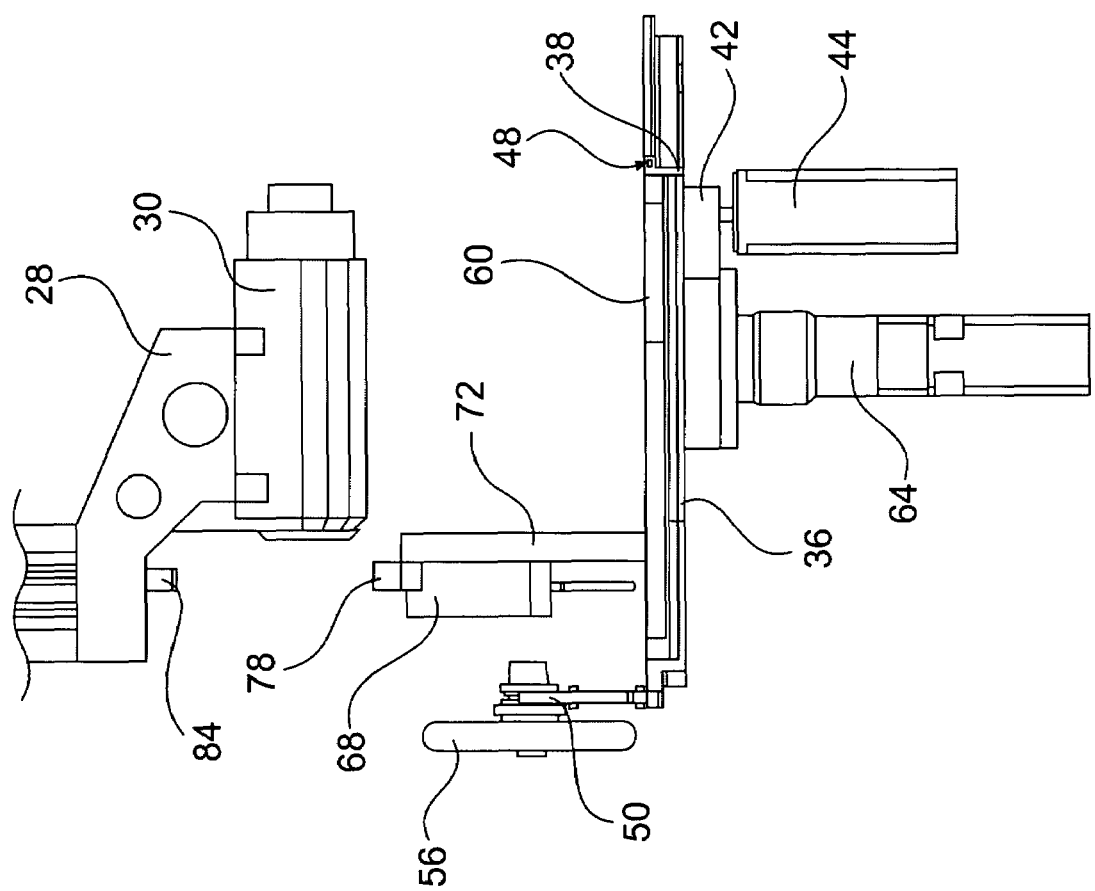
Figure 22:
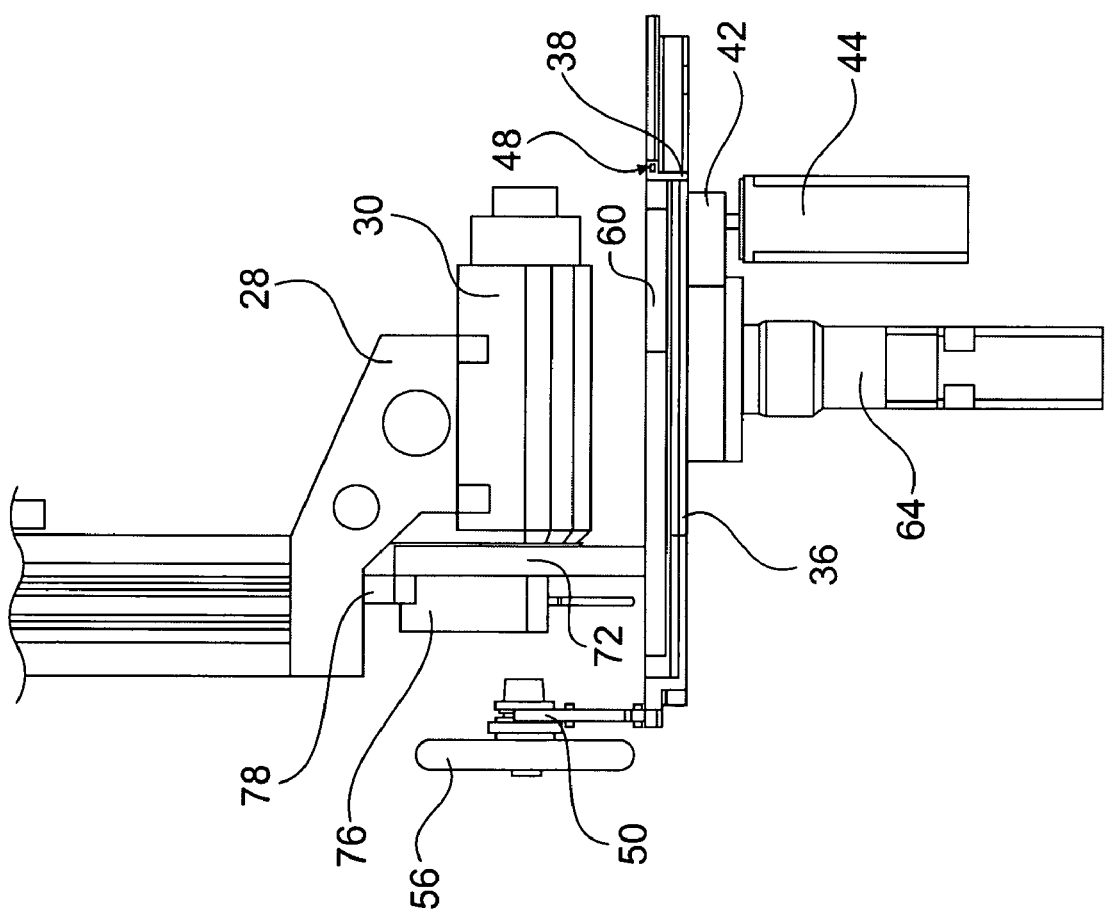
Figure 23:
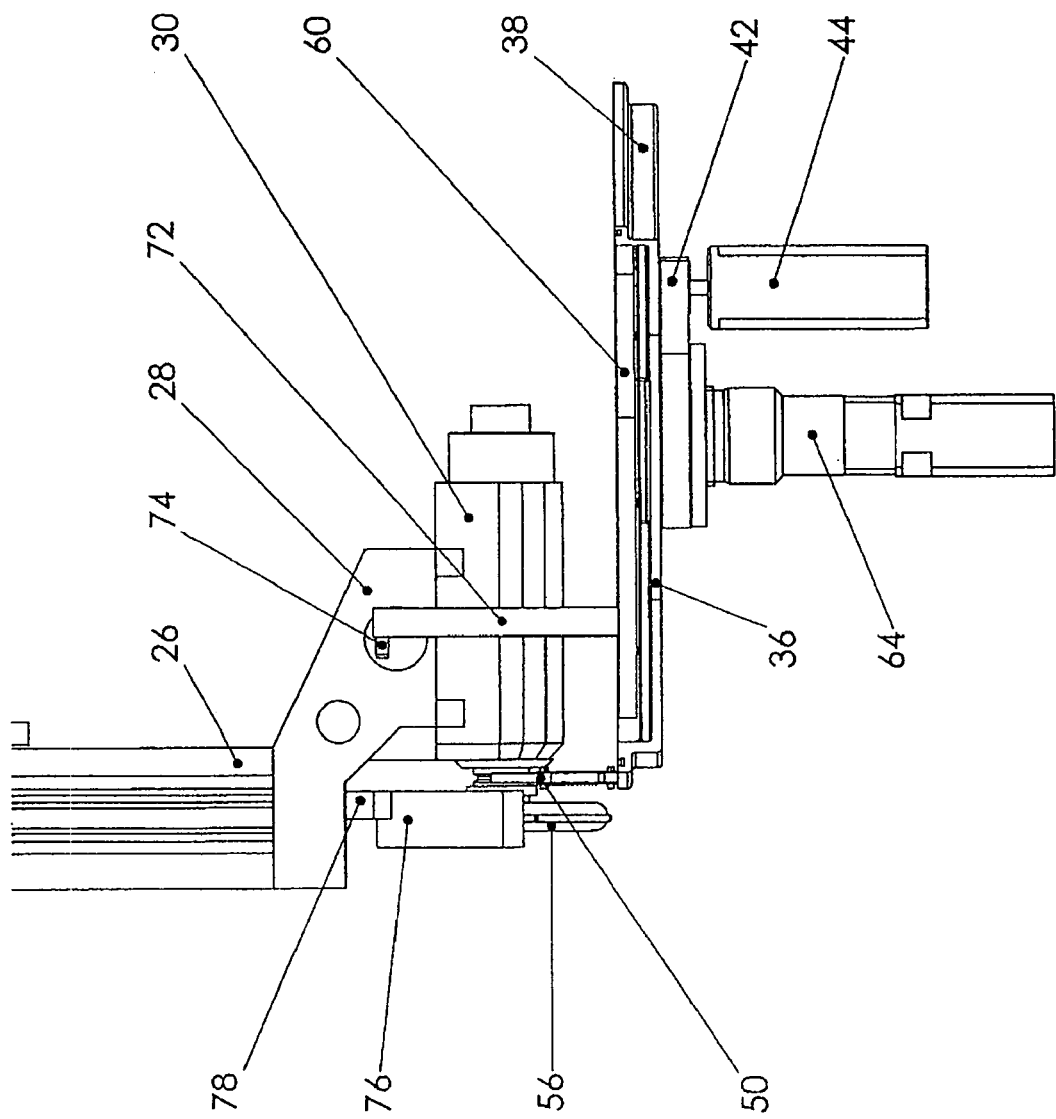
Figure 24:
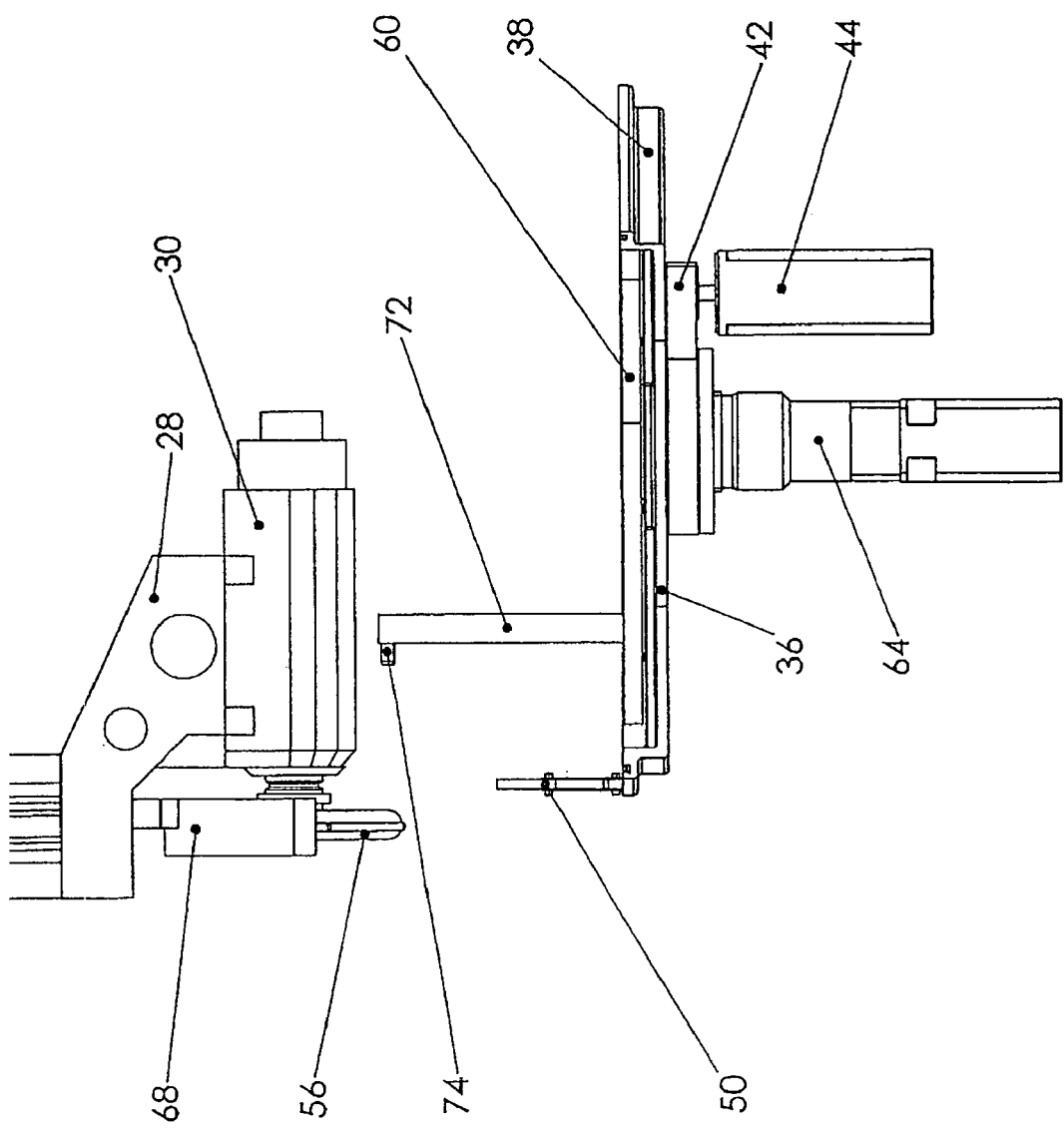

Thereafter, the Z-slide 26 along with the support 28 and the tool spindle 30 are moved above the grinding wheel protector 68 above the tool magazine, as shown in FIG. 21. The Z-slide 26 is then lowered vertically, whereby the coupling stud 84 of the support 28 engages into the coupling hole 82 and the grinding wheel protector 68 is coupled with the support 28. FIG. 22 shows this. Subsequently, the Z-slide 26 is moved along the Y-axis, as shown in FIG. 23. The grinding wheel protector 68 coupled via the coupling stud 84 with the support 28 is pulled off the mounting mandrels 74 of its protector mounting 70 in the radial direction and the tool spindle 30 is pushed with its tool mounting onto the tool shaft of the tool 56, so that the tool can be clamped 56 by the tool spindle 30 as shown in FIG. 23. Thereafter, the Z-slide 26 is driven up vertically, so that the tool 56 is lifted out of its tool holder 50 as shown in FIG. 24. The tool spindle 30 with the clamped tool 56 and the grinding wheel protector 68 coupled to the support 28 can now be moved into the work space for processing the work piece.

The delivery of a tool 56 and an associated grinding wheel protector 68 into the tool magazine takes place in the reverse order of these steps.

REFERENCE SYMBOL LIST

10 Machine bed
12 Work piece spindle
14 Work piece spindle drive unit
16 Work piece
18 Tailstock
20 Side walls
22 Y-guides
24 Bridge
26 Z-slide
28 Support
30 Tool spindle
32 Partitions
34 Outer magazine wheel
36 Magazine disk
38 Magazine ring
40 Drive shaft
42 Toothed belt
44 Motor
46 Cutout
48 T-groove
50 Tool holder
50' Open tool holder
52 Foot
54 Mounting
56 Tools
58 Inner magazine wheel
60 Magazine disk
62 Drive shaft
64 Motor
68 Grinding wheel protector
70 Protector mountings
70' Open protector mounting
72 Support arms 74 Mounting pin
76 Protective cover
78 Mounting bracket
80 Coolant nozzles
82 Coupling hole
84 Coupling stud

The invention claimed is:

1. Tool magazine for a machine tool, the tool magazine comprising a rotatable wheel having tool holders, which are successively arranged in the circumferential direction of the wheel in a row in the tool magazine and which accept tools that are interchangeable, characterized in that the positions of the tool holders (50) in the tool magazine (34) are slidably adjustable relative to the wheel in a groove in the direction of the row and fixable in their respective positions.

2. Tool magazine according to claim 1, characterized in that the tool holders (50) are clampable in their respective positions in the tool magazine (34).

3. Tool magazine according to claim 2, characterized in that the groove is a T-groove (48) extending in the direction of the row, in which the tool holders (50) fit and in which the tool holders (50) are adjustably moved and clampable.

4. Tool magazine according to claim 3, characterized in that the magazine wheel is a circular magazine wheel (34).

5. Tool magazine according to claim 2, characterized in that the magazine wheel is a circular magazine wheel (34).

6. Tool magazine according to claim 1, characterized in that the magazine wheel is a circular magazine wheel (34).

7. Tool magazine according to claim 6, characterized in that the tool holders (50) are located on the periphery of the magazine wheel (34) and extend essentially parallel to the rotation axis of the wheel and hold the tools (56) with radially directed tool central longitudinal axis.

8. Tool magazine according to claim 7, characterized in that the tools (56) are accepted in the tool holders (50) with shafts thereof directed radially toward the inside of the magazine wheel (34).

9. Tool magazine according to claim 8, characterized in that a tool holding fixture (30) is displaceable into the inside of the magazine wheel (34) and is movable relative to a respective tool holder for purposes of the tool exchange, while the respective tool central longitudinal axis is aligned radially in the magazine wheel (34).

10. Tool magazine according to claim 9, characterized in that the magazine wheel (34) has a vertical rotation axis and that the tool holders (50) have mountings (54) that open upward, into which the respective tool is placeable (56) from above and is held in the respective mounting (54) by its own weight.

11. Tool magazine according to claim 8, characterized in that the magazine wheel (34) has a vertical rotation axis and that the tool holders (50) have mountings (54) that open upward, into which the respective tool is placeable (56) from above and is held in the respective mounting (54) by its own weight.

12. Tool magazine according to claim 7, characterized in that the magazine wheel (34) has a vertical rotation axis and that the tool holders (50) have mountings (54) that open upward, into which the respective tool is placeable (56) from above and is held in the respective mounting (54) by its own weight.

13. Tool magazine according to claim 1, characterized in that the respective positions of the tool holders (50) in which they are fixed in the tool magazine (34) are stored in a control of the machine tool.

14. Tool magazine according to claim 1, wherein each of the central longitudinal axes of the tools are arranged essentially perpendicular to the row.

* * * * *